(12) United States Patent
Montgomery

(10) Patent No.: US 11,597,599 B2
(45) Date of Patent: *Mar. 7, 2023

(54) APPARATUS, SYSTEM, AND METHOD FOR A DRIVE-THROUGH GROCERY SERVICE

(71) Applicant: Hotberry, LLC, North Las Vegas, NV (US)

(72) Inventor: Karen Lynnette Montgomery, North Las Vegas, NV (US)

(73) Assignee: Hotberry, LLC, North Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 17/745,445

(22) Filed: May 16, 2022

(65) Prior Publication Data
US 2022/0274782 A1    Sep. 1, 2022

Related U.S. Application Data

(63) Continuation of application No. 16/937,323, filed on Jul. 23, 2020, now Pat. No. 11,358,795, which is a
(Continued)

(51) Int. Cl.
*G06Q 30/06* (2012.01)
*B65G 1/137* (2006.01)
(Continued)

(52) U.S. Cl.
CPC ....... *B65G 1/1376* (2013.01); *G06Q 30/0603* (2013.01); *G06Q 30/0633* (2013.01); *G06Q 50/28* (2013.01)

(58) Field of Classification Search
None
See application file for complete search history.

(56) References Cited

U.S. PATENT DOCUMENTS 3,647,026 A    3/1972  Alexander et al.
3,741,345 A    6/1973  Saridis
(Continued)

FOREIGN PATENT DOCUMENTS

WO    03/106311 A1    12/2003

OTHER PUBLICATIONS

T. Borangiu, P. Gilbert, N. Ivanescu and A. Rosu, "Holonic robot control for job shop assembly by dynamic simulation," 2008 16th Mediterranean Conference on Control and Automation, 2008, pp. 419-424, doi: 10.1109/MED.2008.4602217. (Year: 2008).*

*Primary Examiner* — Michelle T Kringen
(74) *Attorney, Agent, or Firm* — Howard & Howard Attorneys PLLC

(57) ABSTRACT

A system for use in consolidating items into orders and delivering items to a workstation is described herein. The system includes a plurality of workstations, each workstation including an assembling area for assembling orders, an assembly line system configured to deliver items to the plurality of workstations, and a computing system to execute the steps of: receiving an order notification indicating an order, identifying items included in the order, assigning a corresponding workstation to the order, and operating the assembly line system to deliver the identified items included in the order to the corresponding workstation.

18 Claims, 19 Drawing Sheets

Related U.S. Application Data continuation of application No. 16/802,101, filed on Feb. 26, 2020, now Pat. No. 10,759,603, which is a continuation of application No. 15/792,209, filed on Oct. 24, 2017, now Pat. No. 10,611,570.

(60) Provisional application No. 62/412,814, filed on Oct. 25, 2016.

(51) Int. Cl.
  *G06Q 30/0601* (2023.01)
  *G06Q 50/28* (2012.01)

(56) References Cited

U.S. PATENT DOCUMENTS

| | | | |
|---|---|---|---|
| 4,560,088 A | 12/1985 | Tan | |
| 5,025,950 A | 6/1991 | Frouteaud et al. | |
| 5,154,260 A | 10/1992 | Patel | |
| 5,186,281 A | 2/1993 | Jenkins | |
| 5,727,352 A | 3/1998 | Bared et al. | |
| 5,890,136 A | 3/1999 | Kipp | |
| 6,439,345 B1 | 8/2002 | Recktenwald et al. | |
| 6,579,052 B1 | 6/2003 | Bonora et al. | |
| 6,719,168 B2 | 4/2004 | Nicolini | |
| 6,843,962 B2 | 1/2005 | Haslam et al. | |
| 7,054,832 B1* | 5/2006 | Vallabh | G06Q 30/0633 705/26.8 |
| 7,673,735 B2 | 3/2010 | Rice et al. | |
| 7,798,759 B2 | 9/2010 | Bonora et al. | |
| 8,061,555 B2 | 11/2011 | Guglielmi et al. | |
| 8,571,701 B2 | 10/2013 | Lunak et al. | |
| 8,600,821 B2 | 12/2013 | Borders et al. | |
| 8,794,519 B2 | 8/2014 | Malik | |
| 9,064,226 B2 | 6/2015 | Waller et al. | |
| 9,135,403 B1 | 9/2015 | Tolmosoff | |
| 9,208,635 B2 | 12/2015 | Fitzgerald et al. | |
| 9,305,281 B2 | 12/2016 | Waddington et al. | |
| 9,568,917 B2 | 2/2017 | Jones et al. | |
| 9,640,014 B2 | 5/2017 | Pritchard et al. | |
| 9,938,081 B2 | 4/2018 | Gondoh et al. | |
| 10,431,034 B2 | 10/2019 | Fan | |
| 10,572,926 B1* | 2/2020 | Bilger | G06Q 30/0625 |
| 2002/0016747 A1 | 2/2002 | Razumov | |
| 2002/0091577 A1 | 7/2002 | Parry et al. | |
| 2002/0120520 A1 | 8/2002 | Hill | |
| 2003/0006241 A1 | 1/2003 | Johnson | |
| 2003/0104841 A1* | 6/2003 | Yamamoto | H04M 1/7243 345/581 |
| 2003/0176942 A1 | 9/2003 | Sleep et al. | |
| 2003/0177072 A1 | 9/2003 | Bared | |
| 2005/0002772 A1 | 1/2005 | Stone | |
| 2005/0063801 A1 | 3/2005 | Durand et al. | |
| 2007/0128007 A1 | 6/2007 | Bonora et al. | |
| 2008/0029595 A1 | 2/2008 | Waller et al. | |
| 2008/0302607 A1 | 12/2008 | Kaplan et al. | |
| 2011/0295411 A1* | 12/2011 | Rotella | G06Q 10/08 700/216 |
| 2012/0213617 A1 | 8/2012 | Winkler | |
| 2013/0271696 A1 | 10/2013 | Dunn | |
| 2014/0114778 A1 | 4/2014 | Miller et al. | |
| 2014/0180479 A1* | 6/2014 | Argue | B65B 5/105 901/47 |
| 2016/0063604 A1 | 3/2016 | Shaffer et al. | |
| 2016/0187886 A1 | 6/2016 | Jones et al. | |
| 2016/0314431 A1 | 10/2016 | Quezada | |
| 2017/0173639 A1 | 6/2017 | Hanson et al. | |
| 2017/0334651 A1 | 11/2017 | Miller et al. | |
| 2018/0022551 A1 | 1/2018 | Gondoh et al. | |
| 2018/0276602 A1 | 9/2018 | Rivalto et al. | |
| 2019/0102965 A1 | 4/2019 | Greyshock et al. | |

\* cited by examiner

APPARATUS, SYSTEM, AND METHOD FOR A DRIVE-THROUGH GROCERY SERVICE

CROSS-REFERENCE TO RELATED APPLICATIONS

This application is a continuation of U.S. patent application Ser. No. 16/937,323, filed Jul. 23, 2020, which is a continuation of U.S. patent application Ser. No. 16/802,101, filed Feb. 26, 2020, (now U.S. Pat. No. 10,759,603, issued Sep. 1, 2020) which is a continuation of U.S. patent application Ser. No. 15/792,209, filed Oct. 24, 2017 (now U.S. Pat. No. 10,611,570, issued Apr. 7, 2020), which claims the benefit of the U.S. Provisional Application No. 62/412,814, filed Oct. 25, 2016, the disclosures of which are hereby incorporated by reference in their entirety.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relates to a drive-through service. More particularly, the invention relates to drive-through service with automated smart shelves.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that shopping service includes a scanner teller station a sacker puller brings gathered ordered customer groceries to be scanned and sent down the conveyor belt to the end of the counter in which the scanner's sacker sacks the groceries. The Parking Numbers are painted in a deep yellow so, the different parking Lanes can be easily identified.

By way of educational background, another aspect of the prior art generally useful to be aware of is that a computer-implemented method and system pertains to drive through grocery pickup. Upon identification and a determination of a corresponding remotely placed order, a customer is directed to a pickup location.

By way of educational background, another aspect of the prior art generally useful to be aware of is that an Internet-based grocery ordering system and method provides drive-through customer pick-up of grocery orders at multiple remote locations as selected by the customer.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
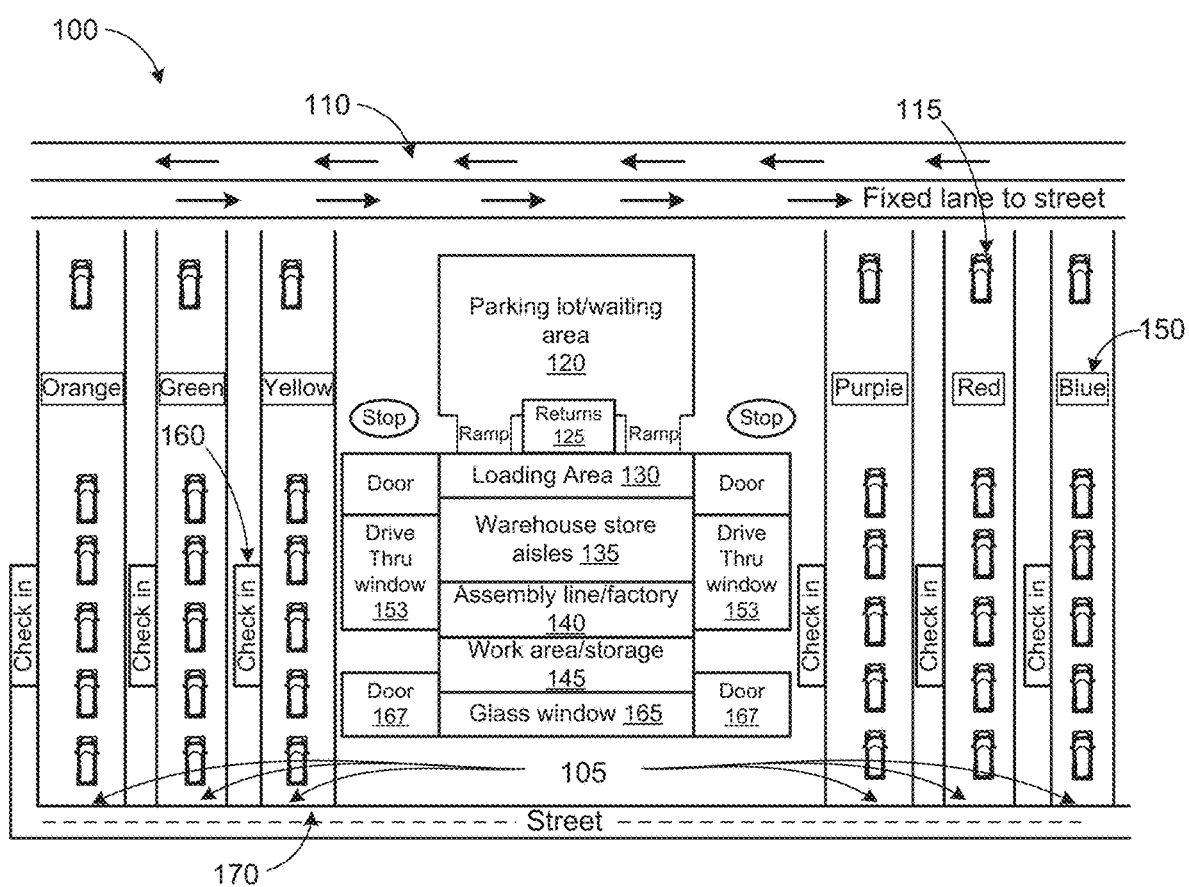
FIG. 1 illustrates an exemplary aerial view and layout of a store in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include substeps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc. v. Roadway Safety Servs., Inc.*, Civ. App. 96-1264, slip op. at 10 (Fed. Cir. Jul. 3, 1997) (unpublished) *Hybridtech v. Monoclonal Antibodies, Inc.*, 802 F.2d 1367, 1385, 231 USPQ 81, 94 (Fed. Cir. 1986), cert, denied, 480 U.S. 947 (1987). In addition, the use of modifiers in the claim, like "generally" and "substantial," does not by itself render the claims indefinite. See *Seattle Box Co. v. Industrial Crating & Packing, Inc.*, 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re *Frye*, Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C. v. Vector Distribution Sys., Inc.*, 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See *Dana Corp. v. American Axle & Manufacturing, Inc.*, Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp. v. Medtronic AYE Inc.*, 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC v. Vector Distribution Sys., Inc.*, 347 F.3d 1314, 1322 (Fed. Cir. 2003); *Epcon Gas Sys., Inc. v. Bauer Compressors, Inc.*, 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example. *Liquid Dynamics Corp. v. Vaughan Co.*, 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp. v. Medtronic AVE, Inc.*, 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems v. Rockwood*

*Retaining Walls, Inc.,* 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary' meaning of such words of approximation, as contemplated in the foregoing, as connoting a term of approximation or a term of magnitude; e g., see *Deering Precision Instalments, L.L.C.* v. *Vector Distrib. Sys., Inc.,* 347 F.3d 1314, 68 USPQ2d 1716, 1721 (Fed. Cir. 2003), cert, denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial"). Also, see, e g., *Epcon Gas Sys., Inc.* v. *Bauer Compressors, Inc.,* 279 F.3d 1022 (Fed. Cir. 2002) (construing the terms "substantially constant" and "substantially below"); *Zodiac Pool Care, Inc.* v. *Hoffinger Indus., Inc.,* 206 F.3d 1408 (Fed. Cir. 2000) (construing the term "substantially inward"); *York Prods., Inc.* v. *Cent. Tractor Farm & Family Ctr.,* 99 F.3d 1568 (Fed. Cir. 1996) (construing the term "substantially the entire height thereof); *Tex. Instruments Inc.* v. *Cypress Semiconductor Corp.,* 90 F.3d 1558 (Fed. Cir. 1996) (construing the term "substantially in the common plane"). In conducting their analysis, the court instructed to begin with the ordinary meaning of the claim terms to one of ordinary skill in the art. *Prima Tek,* 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac,* 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e g., painting the wall up to the door). On the other hand, as pointed out by *Sollac,* when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.,* 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.,* 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp.* v. *Gabriel Elecs. Inc.,* 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.,* 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.,* 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp.* v. *Micron Seps.,* 66 F.3d 1211, 1217, 36 USPQ2d 1225, 1229 (Fed. Cir. 1995); see, e.g., *Andrew Corp.* v. *Gabriel Elecs. Inc.,* 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said, "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason. Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of, or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured nonliving entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

"Terminology." The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ". Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn. 112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of excludes any element, step, or ingredient not specified in the claim. When the phrase "consists of (or variations thereof) appears in a clause of the body of a claim, rather than immediately following the preamble, it limits only the element set forth in that clause; other elements are not excluded from the claim as a whole. As used herein, the phase "consisting essentially of limits the scope of a claim to the specified elements or method steps, plus those that do not materially affect the basis and novel characteristic(s) of the claimed subject matter. Moreover, for any claim of the present invention which claims an embodiment "consisting essentially of a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus, in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, handheld devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example. Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, and (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, Fire Fox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal.

Many embodiments, and variations thereof, provide a system that utilizes software technology, the Internet and automated machines and technology to gather and distribute grocery items to customers. Many embodiments, and variations thereof, provide a Smart Shelf (Intelligent Shelf) The Smart Shelf disperses numerous items at once. It is initiated by and moves the items onto a conveyor belt simultaneously. Many embodiments, and variations thereof, provide a system that utilizes a layout of multiple conveyor belts, carousel and the drive-through lanes that allow continuous traffic. Many embodiments, and variations thereof, provide a system that utilizes a divider and/or mechanical pieces that push the items onto the conveyor belt and also push the items across the grocery scanner. The scanner may send a signal to the software referencing the location of inventory in the store. Many embodiments, and variations thereof, provide a system that utilizes a camera that identifies items from far distances and the alert that triggers the item to be placed into a specific lane. Many embodiments, and variations thereof, provide a system that utilizes walk in refrigerated areas that allow quick access to shopping orders that are waiting for the customer to retrieve.

FIG. 1 illustrates an exemplary aerial view and layout of a store in accordance with an embodiment of the present invention. In the present embodiment, six color coded drive-through lanes 105 are illustrated. In other embodiments, the number of lanes and coding may vary. In some embodiments, one or more lanes 105 may be designated as "express" lanes. In a non-limiting example, "express" lanes may be used by customers, but not limited to, purchasing a predetermined maximum of items, have placed their order online, have paid for their order upon arrival through a check-in device 960, FIG. 9, etc. In some embodiments, the check in device may be a computer screen that allows a user to check in, and/or allows them to select items from an inventory. In nonlimiting examples, the check in software may ask a user how many items they plan to purchase; if it is over X number of items, the check in unit asks the user to drive to parking lot/waiting area and use their computer device (phone, tablet) and purchase items there. There may be 2-3 large screens near the return area that allow customers to walk up and select items on the large screen. Instructions may be located in app and website such as, but not limited to, instructional video letting users know to select items before visiting or go to the parking area to virtually select items for purchase. In many embodiments, "express" lanes may be intended for customers requiring a minimum amount of time to receive their purchase.

In the present embodiment, layout 100 may include a parking lot and or waiting area 120, a returns area 125, a loading area 130, a warehouse 135, an assembly line 140, check-ins 160, work spaces and a storage area 145, drive through windows 153, and doors 167. In the parking lot and or waiting area 120, customers may park and wait for their order to be ready for pickup. In some embodiments, the customers select items in their app or on the website. The moment they select Pay or Pick Up on the app/site, then the software may tell them how many minutes it will take to deliver items. In some embodiments, the software may calculate the total delivery time (from shelf to drive through lane) by calculating the number of items selected by the speed of the conveyor belt and by the delivery time of grocery items to drive through lane. If the customer selects Pick Up or Hold Groceries, then the customer has his/her order on hold and the software may not remove items from the Smart Shelf. It may simply check to see if items are available in the inventory. If customer selects Pay, the customer's credit card may be charged and the customer may pick up the items the same day at any time. In a nonlimiting example, if the software says you may pick up your order in 5 minutes, if the customer is still at work, the customer may pick up items any time after work before close of business that day. The items may remain in the refrigerated unit until close of day. This may eliminate the need to set appointments. If the customer does not pick up items the same day, the items may be deshopped at the end of the evening and the customer may be charged with an "inconvenience charge." Customer may provide a credit card before the software saves a grocery item list. The customer may choose to enter in personal identifiable information such as, but not limited to, a phone number or Membership ID at the check in station in the lane and choose to click Pay once he/she arrives in order to avoid the inconvenience fee. In some embodiments, customers may park in area 120 and may enter returns area 125 to return or replace an item. In some embodiments, returns area 125 may include an area large enough to hold sensitive items such as, but not limited to, produce since some customers may insist on selecting their own produce items. In some alternate embodiments, customers may enter returns area 125 to purchase an item that they may have forgotten to put on their order. Some embodiments may include a glass window 165 where operations in the work area may be viewed and workers may view traffic flow of cars 115.

In typical operations of layout 100, customers may enter off of a main street 170. After entering, customers may choose or be directed to one of the lanes 105. In a non-limiting example, if the customer clicks pay, the software may let the customer know which colored lane to enter into off of the main or secondary street. In some embodiments, lanes 105 may include traffic regulator red/green lights 150 and color coded signage. After completing their purchase near drive-through window lane 150 and 153, the customers may receive their purchase and exit to a street 110.

Figure 2:
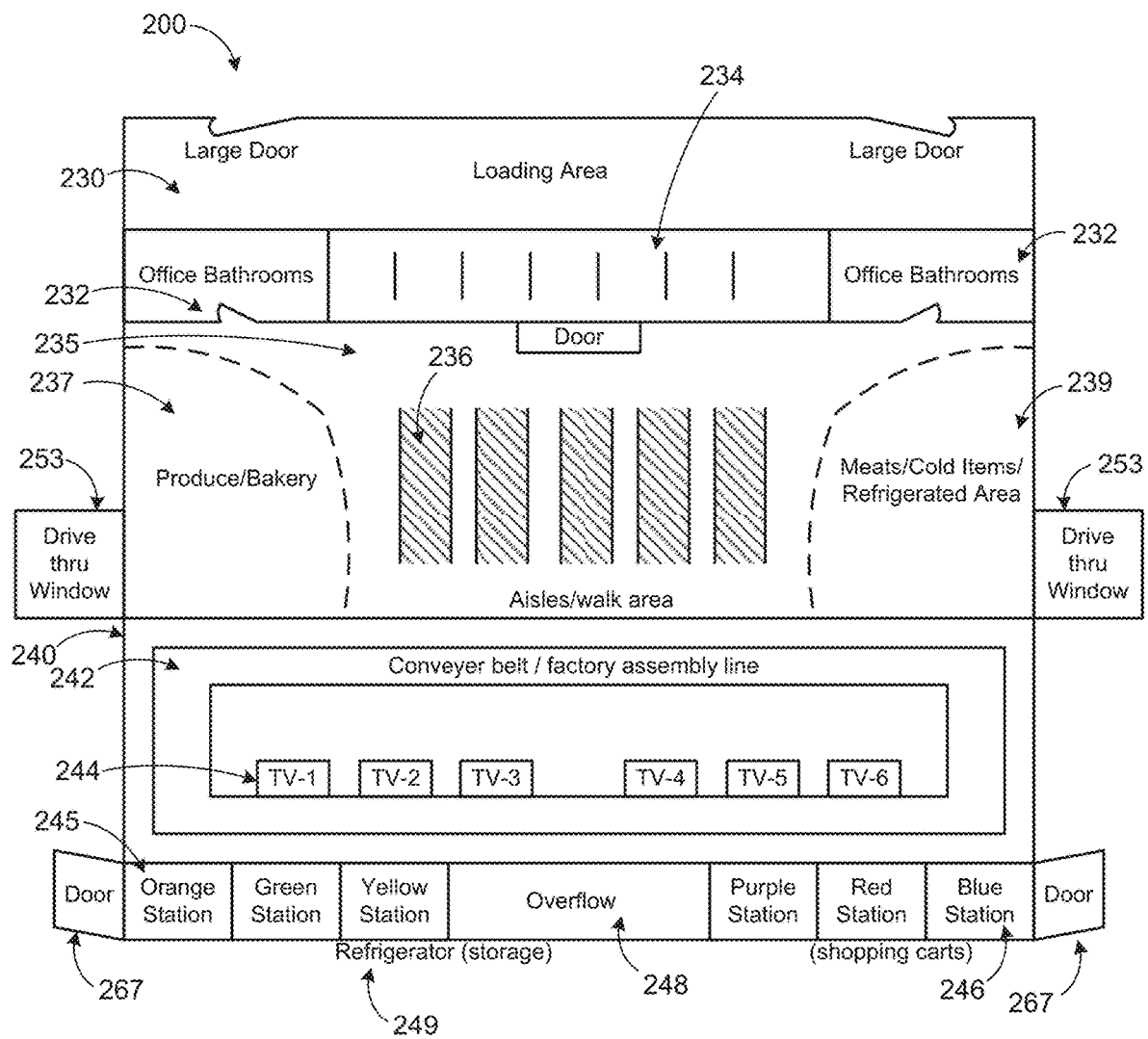
FIG. 2 illustrates an exemplary interior layout of a store, in accordance with an embodiment of the present invention.

FIG. 2 illustrates an exemplary interior layout of a store, in accordance with an embodiment of the present invention. In the present embodiment, a layout 200 may include a loading area 230, offices 232, small aisles 234, a warehouse area 235, an assembly line 240, work spaces and a storage area 245, a storage area 249, drive through windows 253, and doors 267. In the present embodiment, warehouse area 235 may include aisles, walkways, produce/bakery or dry foods area 237, refrigerators or meats and cold items area 239, and mechanical shelves and conveyor belts 236 with smart mechanical shelves. In the present embodiment, assembly line 240 may include a conveyer belt 242 and monitors 244. In the present embodiment, work spaces and a storage area 245 may include a plurality of workstations 246, an overflow station 248, and walk-in refrigeration units and shopping cart area 249. Refrigeration units 249 may be large enough to allow employees to walk in and grab shopping carts with orders waiting to be distributed to customers.

In operations of the present embodiment, vendors may deliver goods through doors in loading area 230. Small aisles 234 may be used for overage or overstocked items. In some embodiments, office locations 232 may include restrooms. In some embodiments, one office may be utilized as a break room.

In the present embodiment, conveyer belt 242 may be configured to rotate in a circular motion. In some embodiments, conveyor belt 242 may be rectangular or oval in shape. In the present embodiment, food items may be dropped or transferred from conveyor belts 236 to conveyer belt/carousel 242. In the present embodiment, monitors 244 may be positioned above conveyer belt 242 and visible by workstations 246. In the present embodiment, overflow station 248 may help fulfill orders that may not be fulfilled by a workstation due to tight timelines.

In the present exemplary embodiment, the number of workstations 246 and refrigeration units 249 may correspond to the number of lanes 105. One skilled in the art may readily know that the number and placement of units and areas may vary in other embodiments and are contemplated in the present invention.

Figure 3:
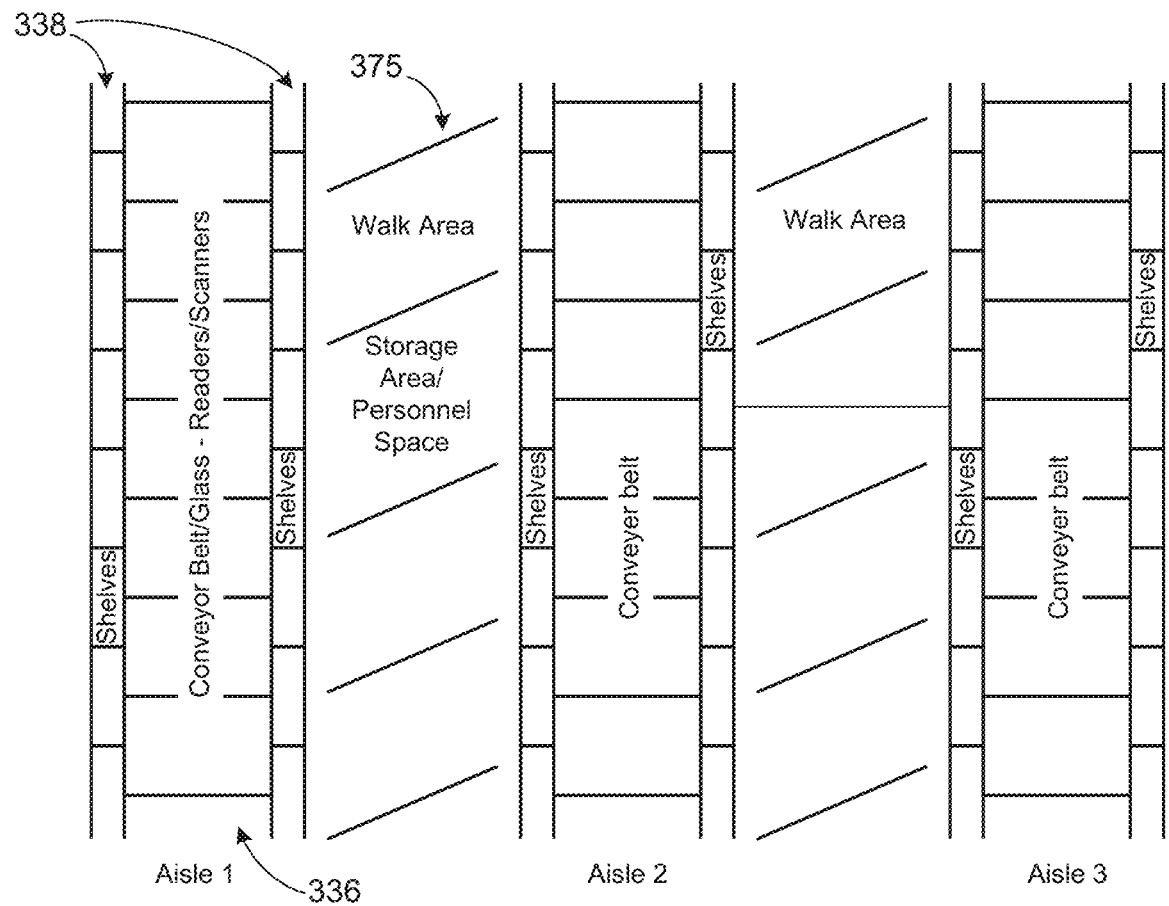
FIG. 3 illustrates an exemplary layout of a warehouse area, in accordance with an embodiment of the present invention.

FIG. 3 illustrates an exemplary layout of a warehouse area, in accordance with an embodiment of the present invention. In the present embodiment, a layout 300 may include a plurality of conveyer belts 336, a plurality of smart mechanical shelves 338, and a plurality of walk areas 375. In the present embodiment, walk areas 375 may include seating areas for employees.

Smart mechanical shelves may distribute food items. In some embodiments, dividers may divide the shelves. In some embodiments, each shelf may contain several "stacks" or rows, which may allow employees to stack multiple food products. In some embodiments, each shelf may contain food items with their own ID or SKU. In many embodiments, the walk area 375 in between the aisles may be large enough for employees to roll boxes of products into that area and stack food items on each shelf. In some embodiments, the employee may use an automated tool to place stickers onto the food item such as, but not limited to, on the front, back sides, bottom or in several areas of the item. In some alternate embodiments, the stickers may have a scan able code that may correspond to items in an inventory database.

Figure 4:
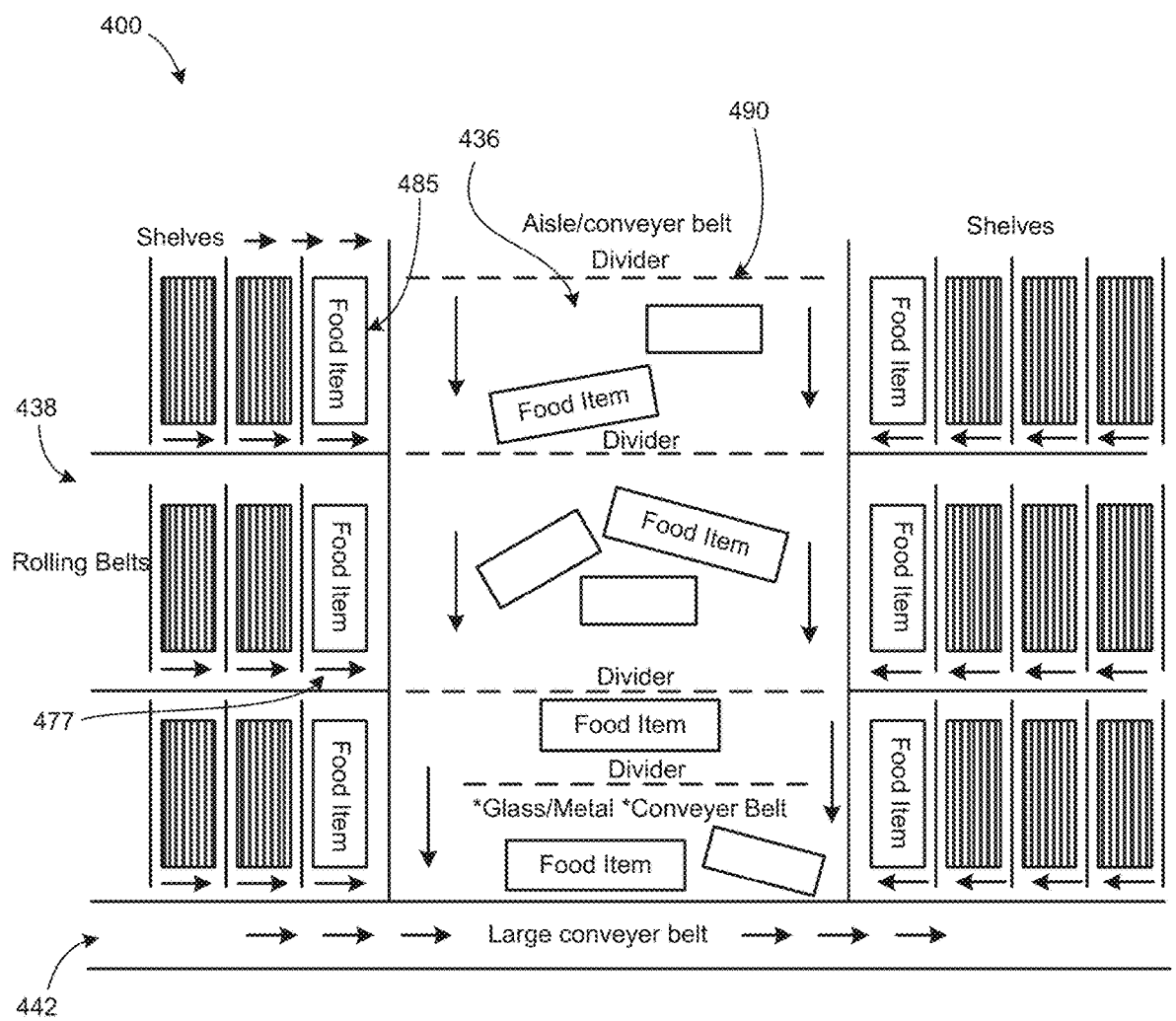
FIG. 4 illustrates an exemplary layout of smart mechanical shelves, in accordance with an embodiment of the present invention.

FIG. 4 illustrates an exemplary layout of smart mechanical shelves, in accordance with an embodiment of the present invention. In the present embodiment, a layout 400 may include a plurality of shelves 438 supporting a plurality of food items 485, and a small conveyor belt 436 or a mechanical divider 490 that may move or push a food item onto a main conveyor belt 442. In the present embodiment, shelves 438 may each include a mechanical device 477 to move a food item 485 from the shelf to the belt 436. In the present embodiment, a mechanical device 477 may be controlled by a computing system. In a non-limiting example, shelves 438 may resemble a vending machine. In the present embodiment, shelves 438 may be stacked to rise vertically from belt 436. In some alternate embodiments, device 477 may include sensors to detect the presence of food item 485. In some other alternate embodiments, the sensors may identify food item 485 before moving to belt 436. In some other alternate embodiments, shelves 438 may include chutes or ramps to guide food items to belt 436. In some other alternate embodiments, the chutes or ramps may include devices to control the rate of movement of the food items. In some other alternate embodiments, shelves 438 may include a manually operated switch to move a food item from the shelf. In a non-limiting example, a customer A in the purple line has ordered fifteen items and one of the items comes from Shelf C25, which contains a desired food item. The application or software sends a signal to Shelf C25 to deliver the item. Shelf C25 may then push one item, based on, but not limited to, weight, length or imagery signals, onto the conveyor belt 436. The conveyor belt 436 may then transfer the item onto the main conveyor belt 442 in the assembly line area 240. Shelf C25 now has one less item in its row or shelf. The computing system may subtract one item from its inventory list for that particular ID or SKU. In some embodiments, a mechanical knob or button may be located near each shelf. This knob or button may allow an employee to manually move the divider to another position. It may also allow the employee to manually change the inventory count and send the data to the computing system.

In the present embodiment, an employee may stack items according to shelf IDs and label each item with a scan able SKU or ID. In some embodiments, food items contained in glass jars or other breakable materials may be stacked onto lower shelves. In some alternate embodiments, belt 436 may include a padding device to cushion the impact of the food item.

Figure 5:
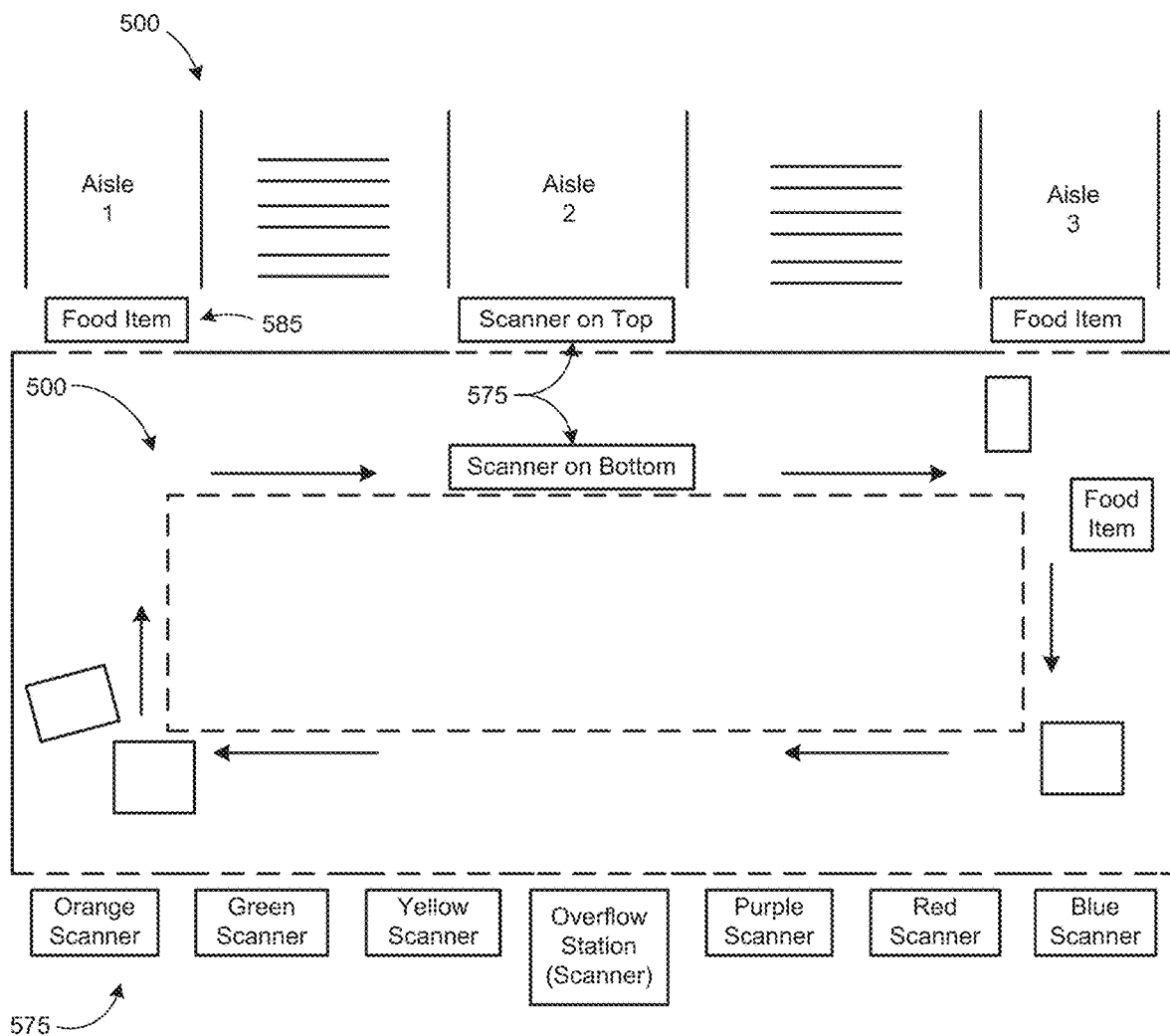
FIG. 5 illustrates an exemplary layout of an assembly line, in accordance with an embodiment of the present invention.

FIG. 5 illustrates an exemplary layout of an assembly line, in accordance with an embodiment of the present invention. In the present embodiment, a layout 500 may include a main conveyer belt 542, and scanners 575. Once a food item 585 hits the main conveyor belt 542, scanner 575 located at the top and/or bottom of belt 542 may scan the item. In some embodiments, an optical recognition technology or any technology that is able to capture details on a product may be employed, such as, but not limited to, the sticker with the ID or SKU. In some alternate embodiments, optical recognition technology along with Artificial Intelligence (AI) may identify the items. The main conveyor belt 542 may distribute items in a rotating fashion until the items are selected or picked up by an employee. Some embodiments may include multiple main conveyor belts 542. In a non-limiting example, an additional conveyor belt may be used for express order for few items per order.

Figure 6:
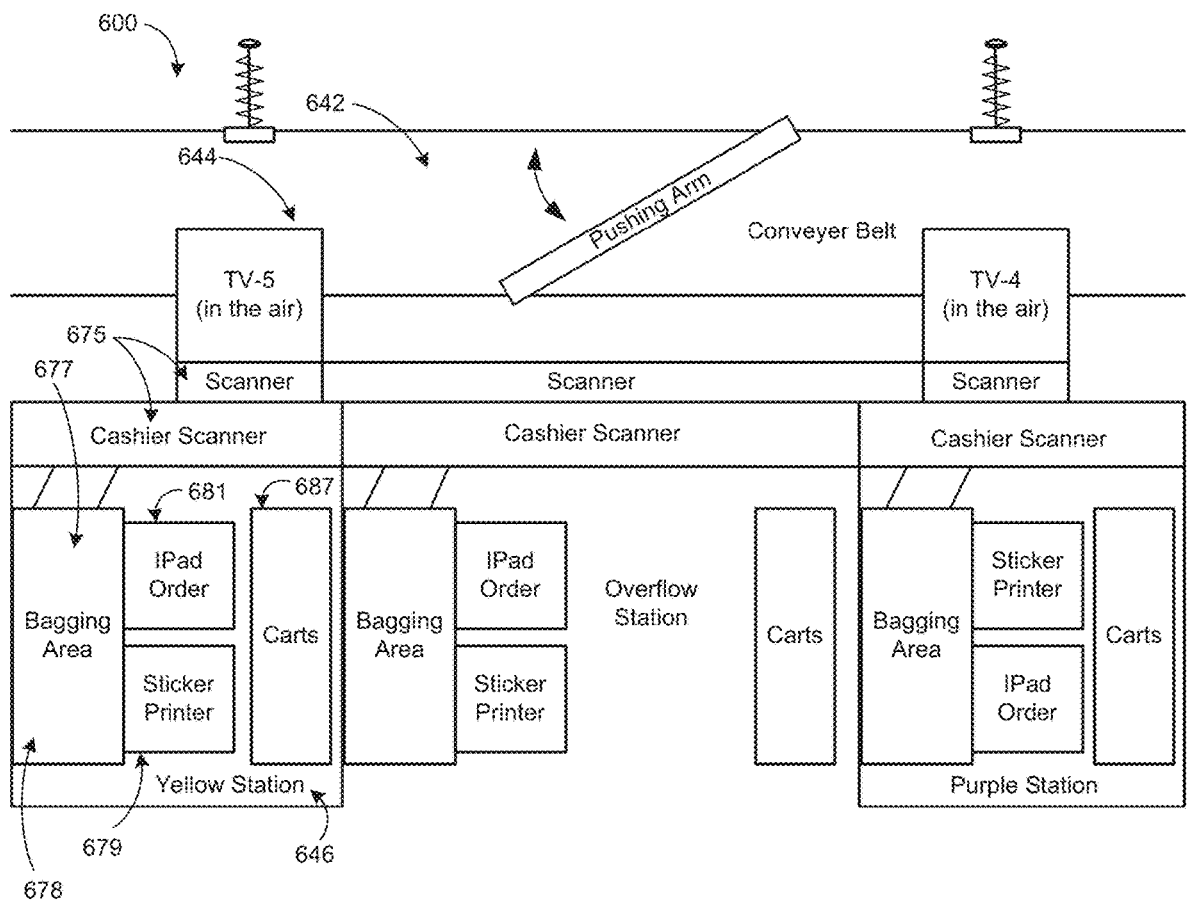
FIG. 6 illustrates an exemplary layout of a workstation, in accordance with an embodiment of the present invention.

FIG. 6 illustrates an exemplary layout of a workstation, in accordance with an embodiment of the present invention. In the present embodiment, a layout 600 may include a main conveyor belt 642, a monitor 644, scanners 675, a bagging area 678, a printer 679, carts 687, and an input/output (IO) device 681. In some embodiments, bagging area 678 may include a computerized sacker 677. Computerized sacker 677 is configured to automate the mechanical sackers by employing conventional electromechanical systems for the physical manipulation (e.g., motors, solenoids, pushers, grabbers, conveyors, active guide rails, etc.), conventional sensors (e.g., bar code reader, camera for object shape detection, optical, infrared, proximity, laser, weight, temperature, etc.), and a computer controller system which acquires the basic characteristics of the product to be sacked from the various sensory data, identifies a next product(s) to be sacked, determines its key characteristics with respect to a certain sacking policy, calculates a suitable sacking plan, and executes the plan by actuating the electromechanical system components as needed towards achieving said sacking policy. By way of example, and not limitation, a sacking policy may be to sack cold items together and separately sack heavy cans at the bottom of sacks, so a suitable system Computerized sacker 677 to achieve this sort of sacking policy may be configured with a temperature sensor, weight sensor, bar code reader, conveyor belt, and active guide rails, wherein the items may be channeled into a single file line, the computer controller system queries the sensors to scan the next item at the front of the line, which enable the computer controller system to "know" the items key characteristics (e.g., bar-code enables getting weight, materials, and shape info from a products database; temperatures sensor indicates if item is much colder than room temperature or not, and weight sensor helps when bar-code may not be readable) to create a sacking action plan for this item. For example, without limitation, the sacking action plan may be as follows: if the items is determined to be a heavy can then the computer controller system may actuate the active guide rail to divert the item, on a conveyor system, to a sacking area for heavy, non-perishable items, and, possible after accumulating enough such items, the mechanical sacker is that area would place the collected heavy item(s) into a sack. The sacking action plan for a cold item(s), or other distinct categories, may proceed similarly. Those skilled in the art will readily recognize, in light of the teachings of the present invention, a wide and diverse variety of alternative means and methods to automate the mechanical sackers to achieve Computerized sacker 677 by designing a suitable conventional electro-mechanical systems, conventional sensors, suitable computer controller system, a suitable sacking policy, a suitable sacking plan, and to suitably execute the action plan by actuating the electro-mechanical system components as needed towards achieving the given sacking policy, in accordance with the needs of the particular application.

In the present embodiment, a cashier may use an IO device 681 to start an order process. IO device 681 may be a mobile computing device such as, but not limited to, a tablet, laptop, smartphone, etc. IO device 681 may be in communication with a computing system. The computing system may send a signal to the monitor 644.

Monitor 644 may be positioned approximately one foot before the cashier's/colored scanner or station. Once an item for the current order is on the main conveyor belt 642, the scanner 675 that may be located underneath monitor 644 may identify the item and monitor 644 may alert the cashier. In a non-limiting example, the main conveyor belt scanner logs the SKU for the food item for Customer A in the purple lane. Once the item rotates to the area where monitors are located, each scanner underneath the monitor may scan the food item. If the food item has a SKU that is needed for Customer A's order, the monitor screen for the purple station may show a picture of the food item on the monitor screen and send an audible alert. The IO device 681 at the station may show order numbers and the amount of items in each order. The computing system may place each Order ID, from the pool of total orders, in ascending order via time stamp. In a non-limiting example, the purple lane has five customers in line. The computing system sends the order numbers in ascending order to the purple station's tablet. The cashier/computerized sacker may know there are five customers waiting. The cashier may monitor the computerized sacker and/or routinely view the tablet while selecting and scanning items to make sure they are not incorrectly grabbing items. The employee or cashier/computerized sacker grabs the item and scans it over the cashier scanner. The computing system may place a check mark or any other identifiable mark next to the scanned item in Customer A's shopping list, which may be visible on the cashier's IO device 681. The cashier's IO device 681 may now reveal a check mark next to an item. The cashier may view IO device 681 at any time to identify ail food items he/she needs to collect to complete the order. The cashier and/or computerized sacker in the purple station may place Customer A's items into bags. Once an order is fulfilled, IO device 681 may send a distinct audible alert and may show a button that says Complete Order ID. The cashier may confirm that all items are in the bags and click Complete Order ID. The cashier may be prompted to click Start Order ID for the next order. If the cashier does not to start the next order, the order ID may remain idle. The overflow station may choose to Start Order [ID] for the purple station's order or for any other station for orders that remain idle for too long. If the overflow station takes control of the next order, this order ID may disappear from the cashier's IO device 681 and reveal the order ID for the next order.

In some embodiments, the speed of the main conveyor belt may be adjustable and the manager or employee in the overflow station may control the belt from that station. The overflow station may have one scanner but the IO device 681 may show all of the upcoming orders for all of the stations. Upcoming orders may be orders for customers who have paid for their order and are in line or are on their way. In some embodiments, if the overflow station's IO device 681 shows numerous idle orders in multiple stations, the manager may choose to send their helpers or employees to the stations that are in need of help, rather than click Start Order ID. In a non-limiting example, if the monitor screen in the green stations sends audible alerts but the cashier and/or computerized sacker is not able to grab the item off the conveyor belt, a helper may help by grabbing the items and placing them on the counter in the station, allowing the cashier time to grab the items and scan them. If the cashier scans an item that is not in their order, the cashier scanner may send out a loud audible alert and the cashier may place that item back onto the conveyor belt. In some embodiments, there may be two computerized sackers for each station, which may enable the items to be retrieved quickly. One of the computerized sacker may be comprised of, but not limited to, metal materials and may include a magnetic strip or sticky material that allows it to pull items incorrectly grabbed and move items back onto the conveyor belt.

Once IO device 681 indicates an order is complete, the cashier or software may print out or automatically print out, on printer 679 a large sticker with an Order ID number on it. The cashier may place the bags into a cart and place the large sticker on the handlebars of the cart 687 or any other readily visible part of the cart. A delivery person or helper may take the cart and roll it into the storage area 249 or to the drive through window area depending on instructions from IO device 681. The delivery person(s) assigned to a station may return carts as necessary or another employee may return carts to all stations as needed. Once the Complete Order ID button may be clicked, the computing system may send the message to the drive through window manager's monitor screen and IO device 681 if the customer has checked in. Computing system may initiate the automated distribution process in the store when a customer pays for an order, whether the customer pays in person at the check-in machine or online (including mobile apps). If the customer has not arrived, the cart may be delivered to the storage area 249.

Figure 7:
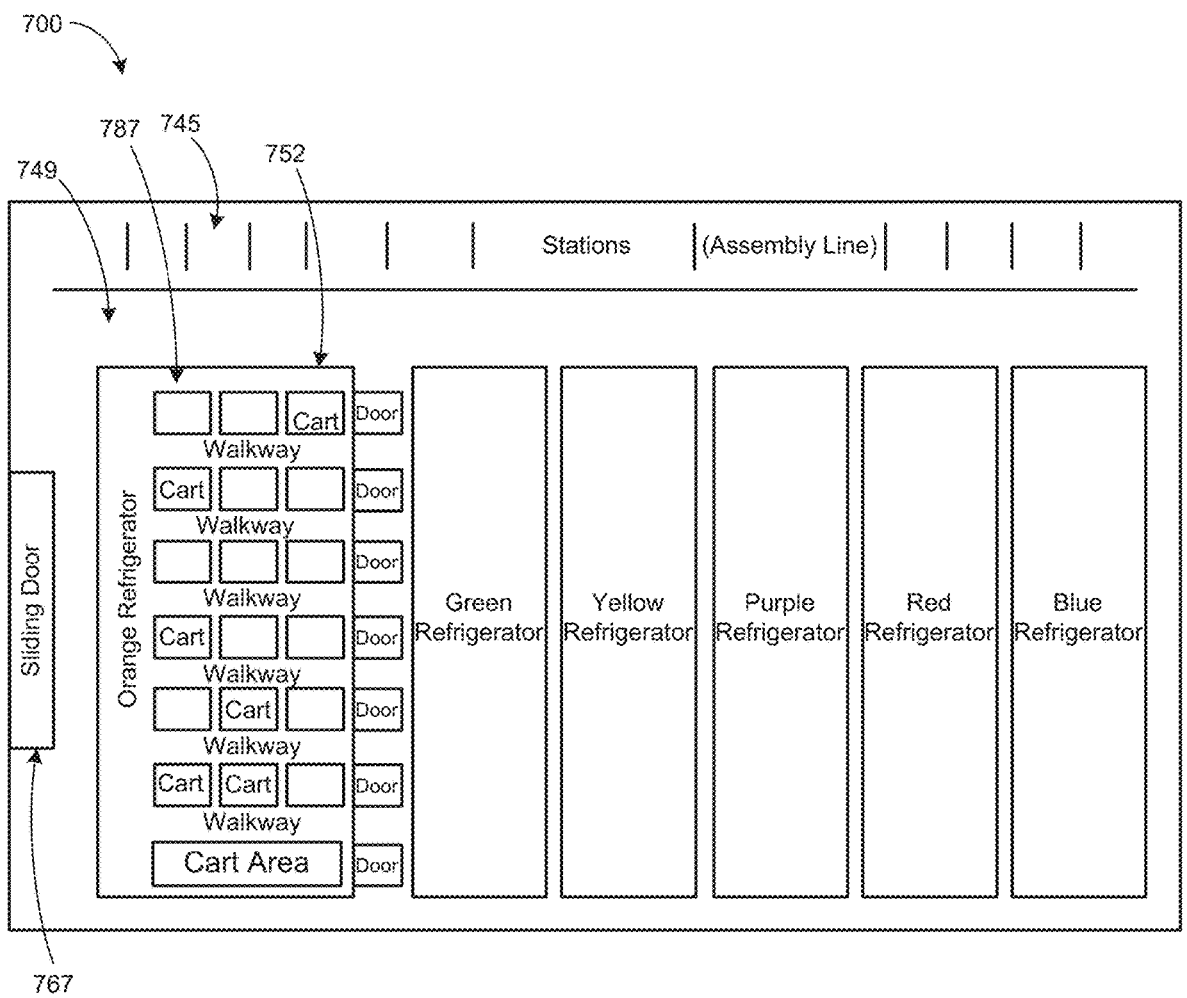
FIG. 7 illustrates an exemplary layout of a storage area, in accordance with an embodiment of the present invention.

FIG. 7 illustrates an exemplary layout of a storage area, in accordance with an embodiment of the present invention. In the present embodiment, a layout 700 may include a portion of workstations 745, a storage area 749, refrigerated units 752, and door 767. Refrigerated units 752 may contain completed orders in carts 787. In some embodiments, storage area 749 may be, located in the front of the store and most visible from the street. In a non-limiting example, if Customer B pays for his order before arriving at the grocery store, the delivery person may deliver the cart 787 with the order ID into the refrigerated section for the purple station. Once Customer B checks in at the designated area, the overflow station may receive an alert, a delivery person may be notified. They may grab the cart from the refrigerator unit and deliver the groceries to the customer. If Customer A is waiting at the front of the delivery lane, a delivery person may push the cart and deliver the groceries immediately. It is anticipated that typically the entire process for the distribution of small to large orders may range between five minutes and fifteen minutes. In some embodiments, customers may check in at device once they pull into a lane. The software may alert the system to let employees know which lane the customer is in, and whether the customer has pulled into the correct colored lane. Employees may need to go to a different colored refrigerated storage unit to retrieve items if the customer pulls into the incorrect lane. The customer's Order Number may be associated with the Sticker ID and searchable by the delivery person. The results may show the color of the refrigerated area the cart is located in.

Figure 8:
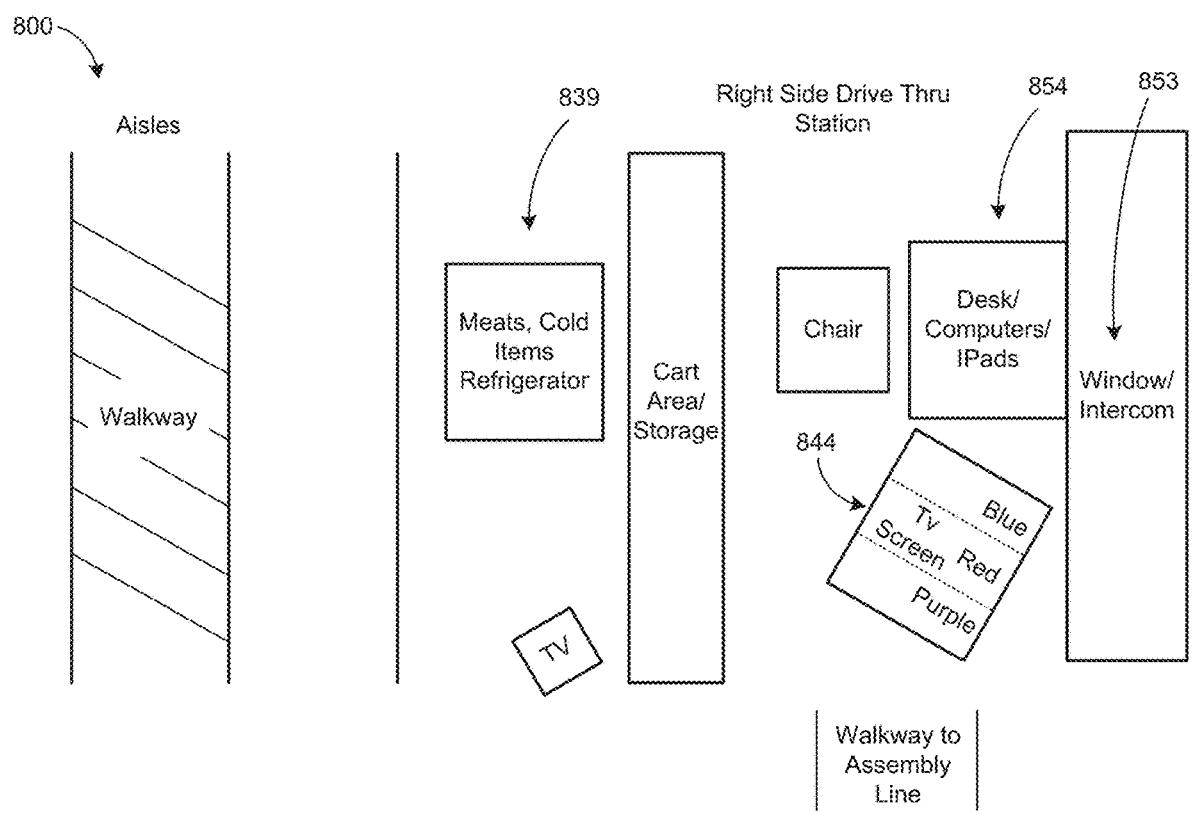
FIG. 8 illustrates an exemplary layout of a storage area, in accordance with an embodiment of the present invention.

FIG. 8 illustrates an exemplary layout of a storage area, in accordance with an embodiment of the present invention. In the present embodiment, a layout 800 may include a drive through window 853, a desk unit 854, a monitor 844 and refrigerators or meats and cold items area 839. Drive through window 853 may include an intercom system for communicating with customers at check-ins 160. Desk unit 854 may include typical desk equipment and IO devices 681. In the present embodiment, mechanical shelves may not be located in the produce/bakery section or the meats/cold items and shopping cart section 839. Designated staff members may be responsible for placing delicate food items onto the main conveyor belt 242. The employees in this specified area may watch monitor 844 to determine how many items are needed. In a non-limiting example, monitor 844 may show that two 2-lb bags of Granny Smith apples are needed, 3 bread rolls are needed, etc. The items may continue to appear on monitor 844 screen until the main conveyor belt's scanner identifies the SKU and/or scan appearance of item. The SKU stickers may be placed onto each food item before the store opens, as employees stack the inventory for the day.

In the present embodiment, each drive through station may contain a large desk 854 including computers, tablets, phones, and a large monitor screen. In some embodiments, next to the main area is a "waiting area" or large rug for the delivery person to stand on. Typically, during a delivery process, a delivery person may stand in the waiting area and make contact with a drive through window manager. This manager may communicate with the customers through an intercom at window 853. Each lane may have an intercom and the manager controls the communication. The manager may speak to each lane separately.

In a non-limiting example, the manager may speak to Customer A in the purple lane. She may ask for the Order ID number. The customer may read the number or provide personal information such as, but not limited to, a phone number, and the manager marks the order number on her IO device 681. The manager may look to the waiting area to ask one of the delivery people if they have the order number. The delivery person in the second position says yes. The manager clicks "Order ID Delivered" on her IO device 681 and may allow the delivery person to deliver the groceries to the car in the first position. The delivery person may confirm the order number with the customer and place groceries into Customer A's car. The delivery person may click Final Delivery of Order ID on their IO device 681 enters through the back door in the warehouse area and walks to the front of the store. The monitor 844 may continue to show completed orders in ascending order according to lane assignments. This may help the manager identify specific orders that should be delivered to the cars in the first position of each lane. If a Customer is in an incorrect lane, the drive through manager may identify the order number and tell the delivery person which lane should receive the order.

Figure 9:
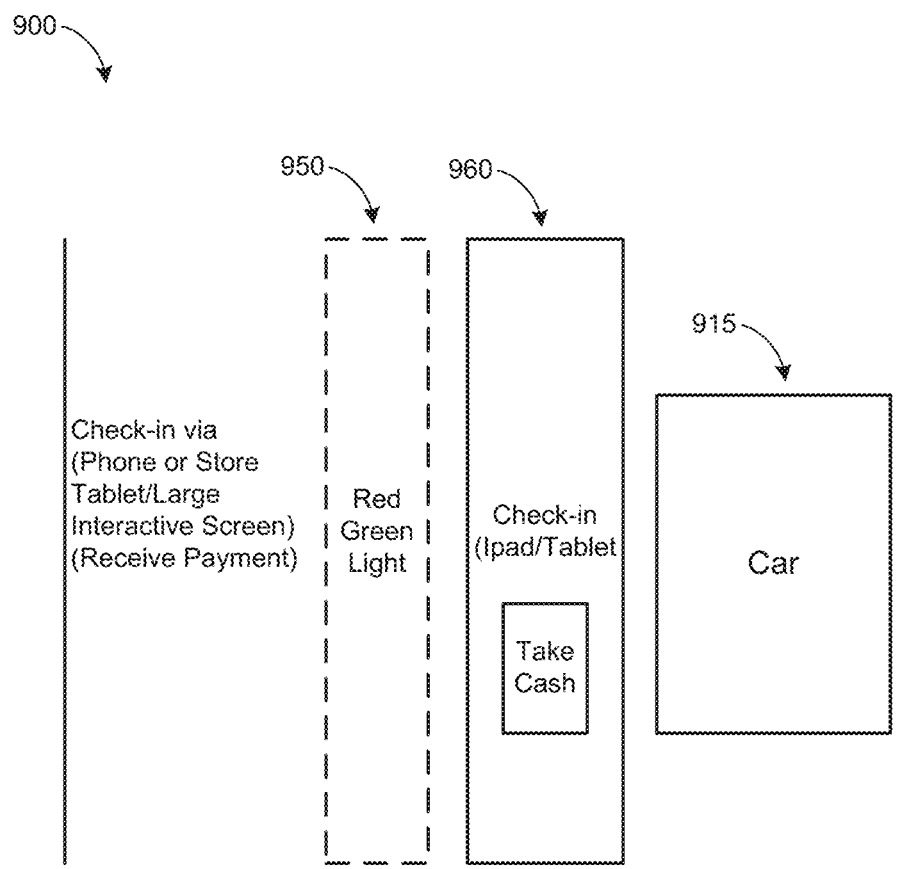
FIG. 9 illustrates an exemplary order process, in accordance with an embodiment of the present invention.

FIG. 9 illustrates an exemplary order process, in accordance with an embodiment of the present invention, hi the present embodiment, a process 900 may include a customer's car 915, and a check-in unit 960. Check-in unit may include IO device 681 or large screen and means for receiving payment. In some alternate embodiments, check-in unit 960 may include means for disbursing cash back. In some embodiments, check-in unit 960 may include a traffic regulator red/green lights 950. In the present embodiment, a customer may utilize a mobile app, the website or mobile site to purchase groceries. The customer may choose to save different lists of grocery items or select items each time they place an order. The technology that interacts with the customers also interacts with the store's computing system. Once the customer completes their list, the software may ask for payment and instruct the customer to pay if they plan to pick up the groceries that day. If the customer hits Pay Now, the customer may be given an estimated time of deliver and may be assigned a lane color. In a non-limiting example, the software may instruct the customer to go to the Green lane. Their order may be ready in 9 minutes. If the customer chooses to pay when they pick up the order, the customer may hit Save My List. The application creates an Order ID number and associates it with the User ID. The User ID is associated with the customer's information such as, but not limited to, payment information, phone number, email address and/or home address. If the customer chooses to pay for their groceries at the store, the customer may enter any lane. In a non-limiting example, internally, the store may designate the Purple and Blue lanes as express lanes. If so, the application may tell the customer when he/they save their list to go to the Blue lane. If the application doesn't designate a lane, the customer will pull into any lane and check in. The check in machine will ask for the order number or customer information such as, but not limited to, a phone number, etc. The customer may enter the information and the machine may ask for a cash payment or instruct the customer to insert a credit card or use a payment method saved in the system. The customer may pay for the order and the machine may give an estimated delivery time. In a non-limiting example. Customer C in the Yellow lane may have an estimated time of 8 minutes. He knows that he will be sitting in the lane for approximately 8 minutes. After payment is received, the light that is on red will turn to green and back to red. At the end of the night, the employees may be responsible for retrieving all cash from the machines and for loading the machine in the morning. In some embodiments, there may be a delivery charge for all orders or a yearly membership fee may be charged. In some embodiments, if the customer pays for the order using the check in machine, the customer may be charged a higher fee. The application may communicate all fees and/or differences in fees before the customer makes a payment via the mobile app, website or through the machine.

Figure 10:
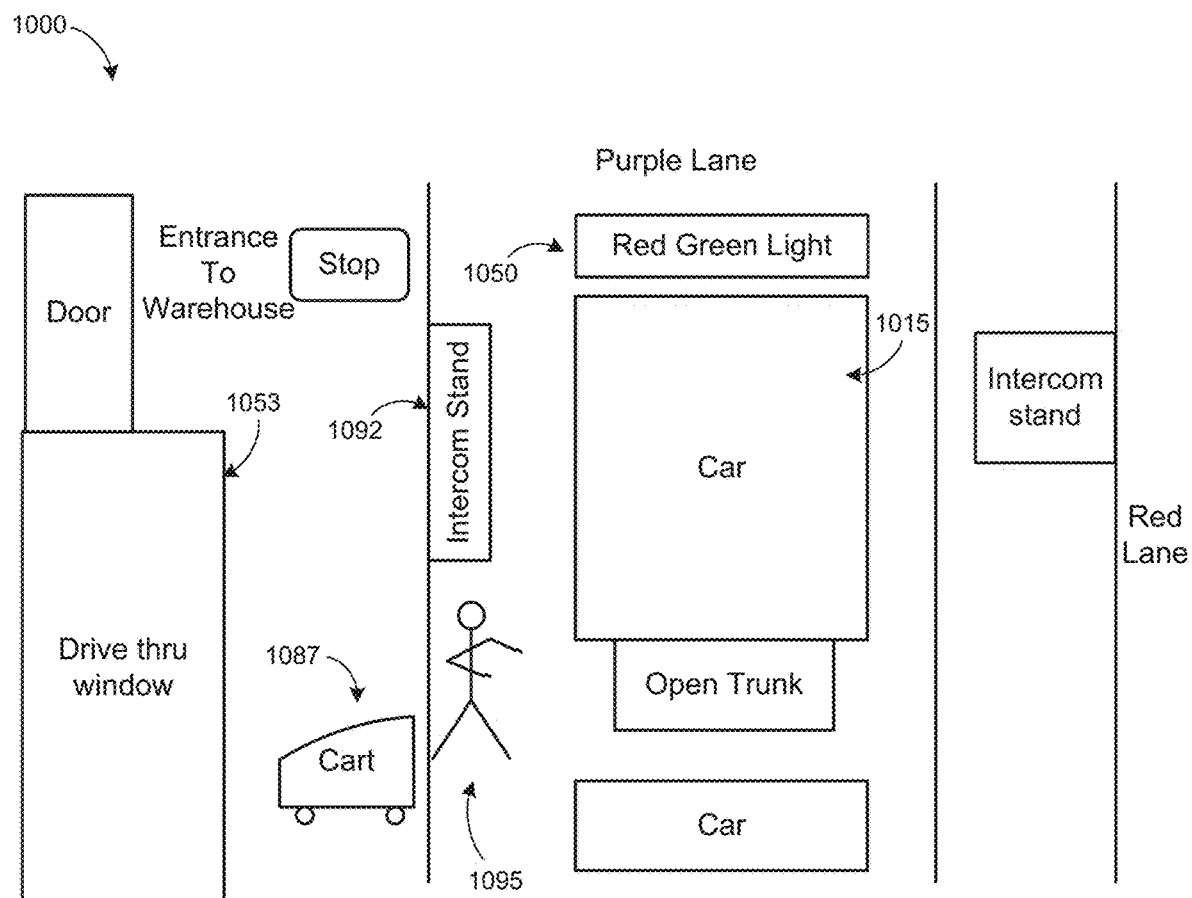
FIG. 10 illustrates an exemplary grocery delivery process, in accordance with an embodiment of the present invention.

FIG. 10 illustrates an exemplary grocery delivery process, in accordance with an embodiment of the present invention. In the present embodiment, a process 1000 may include a customer's car 1015, an intercom 1092, a cart 1087, a delivery person 1095, a drive through window 1053, and a traffic regulator red/green lights 1050. In a non-limiting example Customer C may pull up to the first position of his lane. The manager may speak to him through the intercom 1092. He may confirm his order number, either by looking at the printed receipt he received at the check in station or by using his mobile app or website. The manager may confirm his order number and his payment. Customer C may be approached by delivery person 1095 in approximately 20 seconds and the person may ask if he would like his bags in the trunk or in the back seat. The delivery person delivers the groceries and hits the "Final Delivery" button on his IO device 681. He may now have a new order number and lane color on his IO device 681. He knows where to pick up his next cart. Customer C sees a green light and drives off. If the order was not ready, the manager would tell Customer C that the order is not complete. If the order for the customer behind Customer C, in the second position, is ready, the manager may tell Customer C to park in the parking lot. The manager may write down a description of the car and attach the information to the order. Once the delivery person 1095 gets to the waiting area, the manager may inform him that the customer is in the parking lot before hitting the Delivered button. If the order for the customer behind Customer C was not ready, the manager may allow the customer to sit in the first position. The application may update all Estimated Time Deliveries to any future orders and orders waiting to be delivered if the customer checks their status on the app or website.

In many embodiments, the computing system may help managers determine how much stock or inventory the store needs on the weekly basis. This information may be sent to vendors to help predict the number of items needed. In many embodiments, the computing system may also calculate the likelihood of a customer returning or how often a customer returns, helping to predict traffic on the weekly basis. In many embodiments, the computing system may graph how often the grocery items are bought at a certain price, which helps set pricing or MSRP for items in the store. In many embodiments, the store's inventory may be recorded in the computing system, and a backup may be taken or stored periodically such as, but not limited to, every fifteen minutes.

In a non-limiting example. Customer D orders food online. The part of the computing system that services the customer may be called the Inventory system. If an item may not be available due to previous paid orders, the computing system may place an out of stock label over the item on the website or mobile app, not allowing the customer to purchase the item. The computing system may offer alternatives based on the category of the food item. Once the order is complete and purchased, the computing system sends the order to a separate tracking system that may be called the Distribution system.

In many embodiments, once the order is sent to the Distribution system, the computing system sends signals to corresponding shelf IDs. The shelf IDs may be controlled by an automated system, using a divider that pushes the item onto the conveyor belt, using a conveyor belt. The belt or divider may move a certain distance in order to push the item onto the belt. The Distribution system may not register the item as distributed until the item is scanned in the cashier station. At that point, the Distribution system may mark the item as Sold and send the data to the Inventory system.

In many embodiments, if the cashier or computerized sacker does not pick up or move the item, the item may continue to rotate on the main conveyor belt. The main scanner may continue to scan the item and send the item to the corresponding monitor screen. At that time, the overflow manager may choose to pick up the item that has been rotating a long time and place it in a deshop cart. The computerized sacker may also push the item to an area near the overflow station and items may drop into a box/bag in the area. If the item is deshopped, or returned back to the shelf, an employee may enter the walkway and place the item on the corresponding shelf and hit the "+1" button near the shelf. The inventory count/total in the Inventory system may be different than the inventory count/total in the Distribution system. If the button is manually pushed, the Distribution system may send a message to the Inventory system and adds one more item to the inventory. The Distribution system may subtract one item from its count. While an employee stocks the aisle, they may enter the number of items being stacked by scanning each item before placing it on a shelf. This may add the correct number of additional items to the Inventory system. If the number of items in the Inventory system shows missing products that have not been labeled sold, the Distribution system may indicate how many items are in its system and were not scanned or sold and ultimately not delivered.

In many embodiments, once the cashier scans the items or the computerized sacker delivers item over scanner and the cashier clicks Complete, the list of inventory items is sent to the Sold system. Executives and managers may analyze this system's data in effort to determine future pricing and stocking processes.

Figure 11:
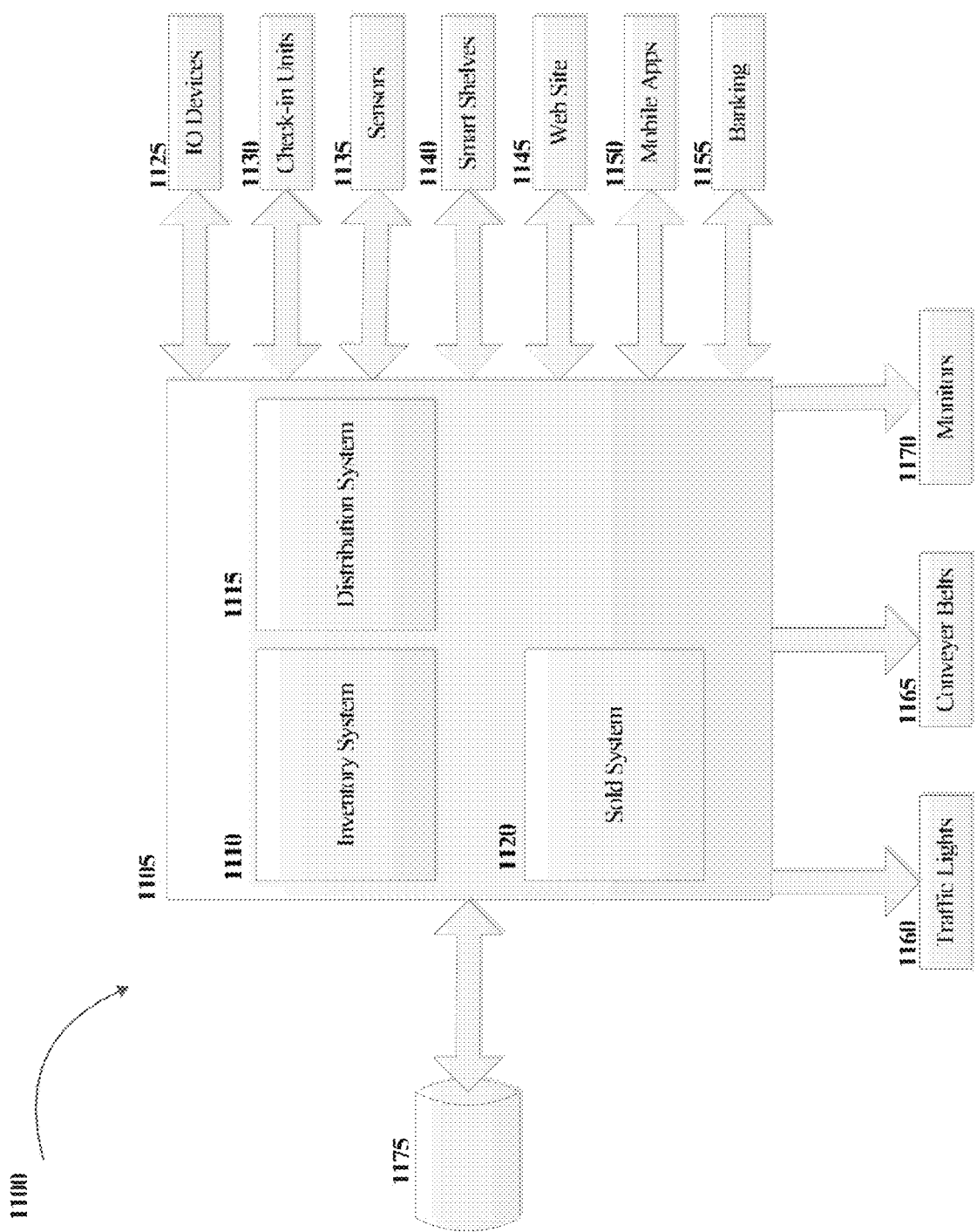
FIG. 11 illustrates an exemplary computing system, in accordance with an embodiment of the present invention.

FIG. 11 illustrates an exemplary computing system, in accordance with an embodiment of the present invention. In the present embodiment, a system 1100 may include a computing unit 1105 including one or more processors to provide an inventory system 1110, a distribution system 1115, and a sold system 1120. Computing unit 1105 may communicate bi-directionally with IO device 1125, check-in units 1130, sensors 1135, smart shelves 1140, Web site 1145, mobile app 1150, banking 1155, and backup storage 1175. Computing unit 1105 may communicate directionally with traffic lights 1160, conveyer belts 1165, and monitors 1170.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 12:
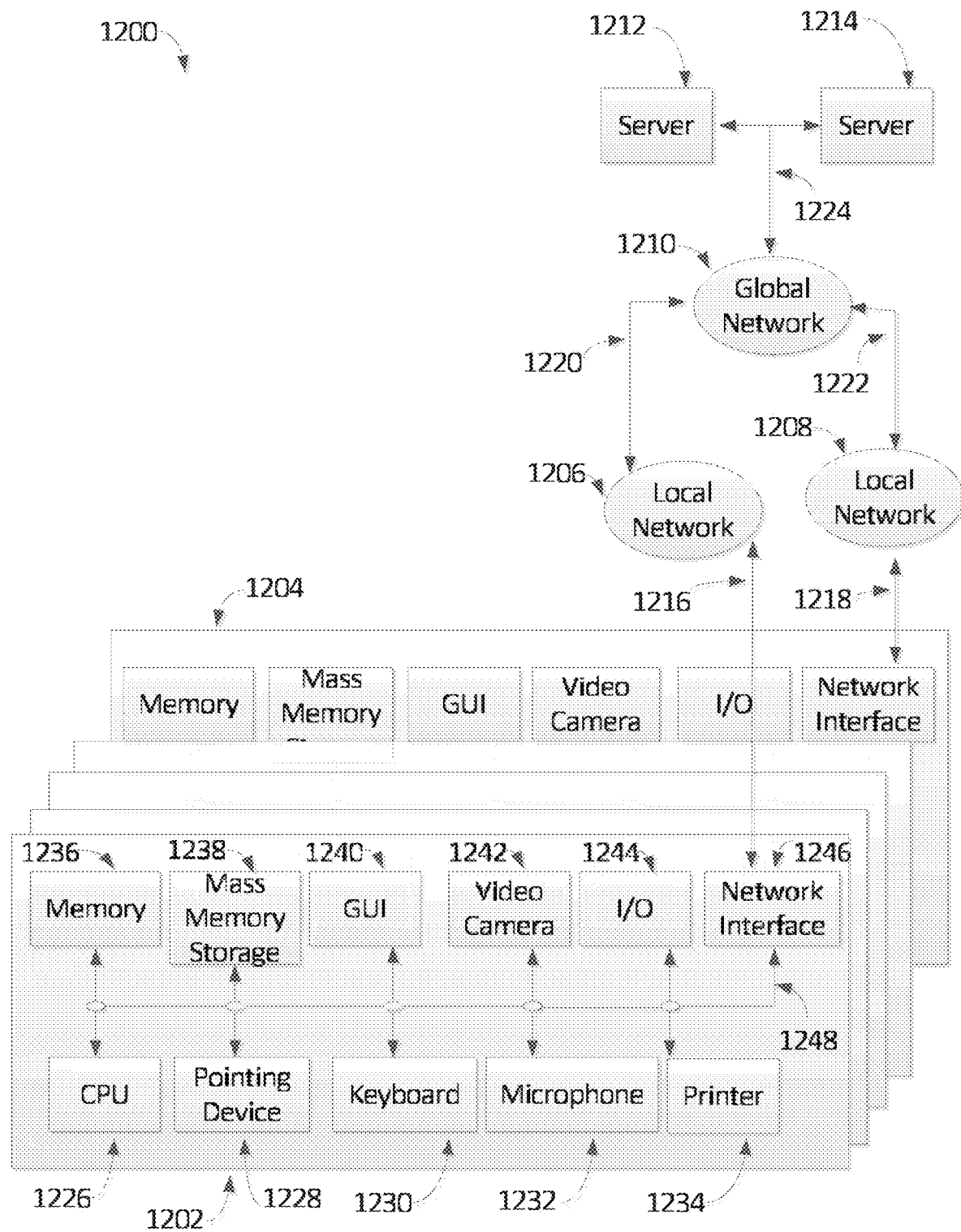
FIG. 12 is a block diagram depicting an exemplary client/server system which may be used by an exemplary web-enabled/networked embodiment of the present invention.

FIG. 12 is a block diagram depicting an exemplary client/server system which may be used by an exemplary web-enabled/networked embodiment of the present invention.

A communication system 1200 includes a multiplicity of clients with a sampling of clients denoted as a client 1202 and a client 1204, a multiplicity of local networks with a sampling of networks denoted as a local network 1206 and a local network 1208, a global network 1210 and a multiplicity of servers with a sampling of servers denoted as a server 1212 and a server 1214.

Client 1202 may communicate bi-directionally with local network 1206 via a communication channel 1216. Client 1204 may communicate bi-directionally with local network 1208 via a communication channel 1218. Local network 1206 may communicate bi-directionally with global network 1210 via a communication channel 1220. Local network 1208 may communicate bi-directionally with global network 1210 via a communication channel 1222. Global network 1210 may communicate bidirectionally with server 1212 and server 1214 via a communication channel 1224. Server 1212 and server 1214 may communicate bi-directionally with each other via communication channel 1224. Furthermore, clients 1202, 1204, local networks 1206, 1208, global network 1210 and servers 1212, 1214 may each communicate bidirectionally with each other.

In one embodiment, global network 1210 may operate as the Internet. It will be understood by those skilled in the art that communication system 1200 may take many different forms. Non-limiting examples of forms for communication system 1200 include local area networks (LANs), wide area networks (WANs), wired telephone networks, wireless networks, or any other network supporting data communication between respective entities.

Clients 1202 and 1204 may take many different forms. Non-limiting examples of clients 1202 and 1204 include personal computers, personal digital assistants (PDAs), cellular phones and smartphones.

Client 1202 includes a CPU 1226, a pointing device 1228, a keyboard 1230, a microphone 1232, a printer 1234, a memory 1236, a mass memory storage 1238, a GUI 1240, a video camera 1242, an input/output interface 1244 and a network interface 1246.

CPU 1226, pointing device 1228, keyboard 1230, microphone 1232, printer 1234, memory 1236, mass memory storage 1238, GUI 1240, video camera 1242, input/output interface 1244 and network interface 1246 may communicate in a unidirectional manner or a bi-directional manner with each other via a communication channel 1248. Communication channel 1248 may be configured as a single communication channel or a multiplicity of communication channels.

CPU 1226 may be comprised of a single processor or multiple processors. CPU 1226 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 1236 is used typically to transfer data and instructions to CPU 1226 in a bi-directional manner. Memory 1236, as discussed previously, may include any suitable computer-readable media, intended for data storage, such as those described above excluding any wired or wireless transmissions unless specifically noted. Mass memory storage 1238 may also be coupled bi-directionally to CPU 1226 and provides additional data storage capacity and may include any of the computer-readable media described above. Mass memory storage 1238 may be used to store programs, data and the like and is typically a secondary storage medium such as a hard disk. It will be appreciated that the information retained within mass memory storage 1238, may, in appropriate cases, be incorporated in standard fashion as part of memory 1236 as virtual memory.

CPU 1226 may be coupled to GUI 1240. GUI 1240 enables a user to view the operation of computer operating system and software. CPU 1226 may be coupled to pointing device 1228. Non-limiting examples of pointing device 1228 include computer mouse, trackball and touchpad. Pointing device 1228 enables a user with the capability to maneuver a computer cursor about the viewing area of GUI 1240 and select areas or features in the viewing area of GUI 1240. CPU 1226 may be coupled to keyboard 1230. Keyboard 1230 enables a user with the capability to input alphanumeric textual information to CPU 1226. CPU 1226 may be coupled to microphone 1232. Microphone 1232 enables audio produced by a user to be recorded, processed and communicated by CPU 1226. CPU 1226 may be connected to printer 1234. Printer 1234 enables a user with the capability to print information to a sheet of paper. CPU 1226 may be connected to video camera 1242. Video camera 1242 enables video produced or captured by user to be recorded, processed and communicated by CPU 1226.

CPU 1226 may also be coupled to input/output interface 1244 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1226 optionally may be coupled to network interface 1246 which enables communication with an external device such as a database or a computer or telecommunications or internet network using an external connection shown generally as communication channel 1216, which may be implemented as a hardwired or wireless communications link using suitable conventional technologies. With such a connection, CPU 1226 might receive information from the network, or might output information to a network in the course of performing the method steps described in the teachings of the present invention.

Figure 13A:
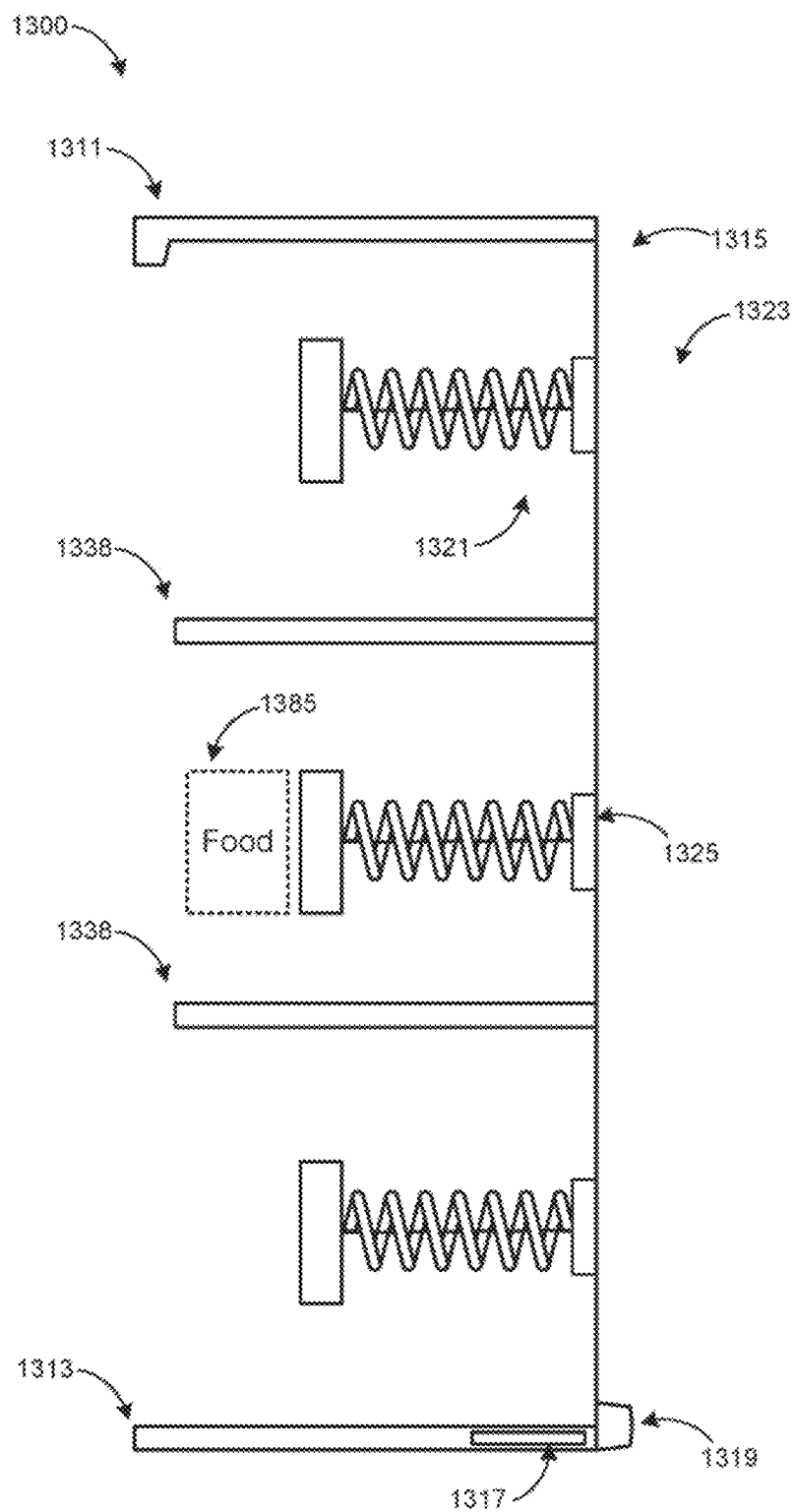
FIG. 13A-13G illustrate exemplary smart shelves, in accordance with embodiments of the present invention.

FIGS. 13A-13G illustrate exemplary smart shelves, in accordance with embodiments of the present invention. Referring to FIG. 13A, in the present embodiment a smart shelves unit 1300 may include a top 1311, a bottom 1313, a back 1315, and shelves 1338. In the present embodiment, unit 1300 may be a part of an assembly of a plurality of smart shelve units and positioned facing a conveyor belt or aisle. In the present embodiment, shelves 1338 may be adjustable in height for supporting various size items 1385. In the present embodiment, a computing unit 1317 and an on/off switch 1319 may be located in bottom 1313. In other embodiments, computing unit 1317 may be located in top 1311 or back 1315. In some alternate embodiments, shelves 1338 may each contain a computing unit 1317 and an on/off switch 1319. In some alternate embodiments, switch 1319 may include an indicator light for indicating a status of computing unit 1317. In the present embodiment computing unit 1317 may communicate bi-directionally with computing unit 1105 for distribution and inventory of items 1385. In the present embodiment, an item mover 1321 may move one or more items 1385 from shelve 1338 to the conveyor belt or aisle. In the present embodiment, computing unit 1317 may activate item mover 1321 through mechanism 1325. In other embodiments, items 1385 may be moved from shelves 1338 by a manual control 1325.

Figure 13B:
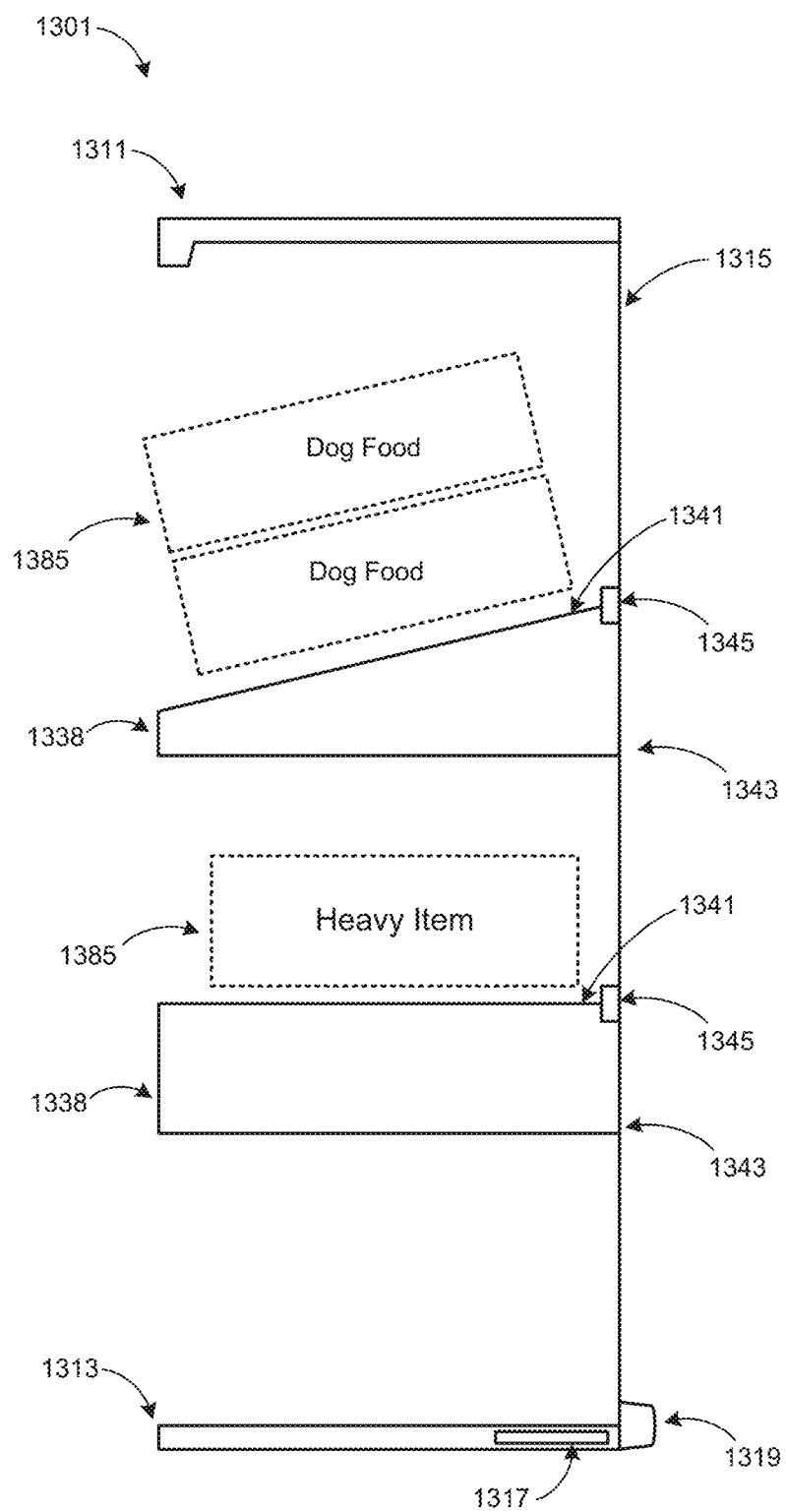

Referring to FIG. 13B, in the present embodiment, a smart shelves unit 1301 may include a top 1311, a bottom 1313, a back 1315, and shelves 1338. In the present embodiment, unit 1301 may be a part of an assembly of a plurality of smart shelve units and positioned facing a conveyor belt or aisle. In the present embodiment, shelves 1338 may be adjustable in height for supporting various size items 1385. In the present embodiment, a computing unit 1317 and an on/off switch 1319 may be located in bottom 1313. In other embodiments, computing unit 1317 may be located in top 1311 or back 1315. In some alternate embodiments, shelves 1338 may each contain a computing unit 1317 and an on/off switch 1319. In some alternate embodiments, switch 1319 may include an indicator light for indicating a status of computing unit 1317. In the present embodiment computing unit 1317 may communicate bi-directionally with computing unit 1105 for distribution and inventory of items 1385. In the present embodiment, shelves 1338 may include a top portion 1341 and a bottom portion 1343. In the present embodiment, computing unit 1317 may activate shelves 1338 to move one or more items 1385 from shelve 1338 to the conveyor belt or aisle. In the present embodiment, top portion 1341 may be moved at an appropriate angle in order to remove one item off of shelf 1338 for a consumer. In some embodiments, a device 1345 such as, but not limited to, a magnet or any other appropriate device may be used to allow the shelf to move easily when prompted automatically or manually.

Figure 13C:
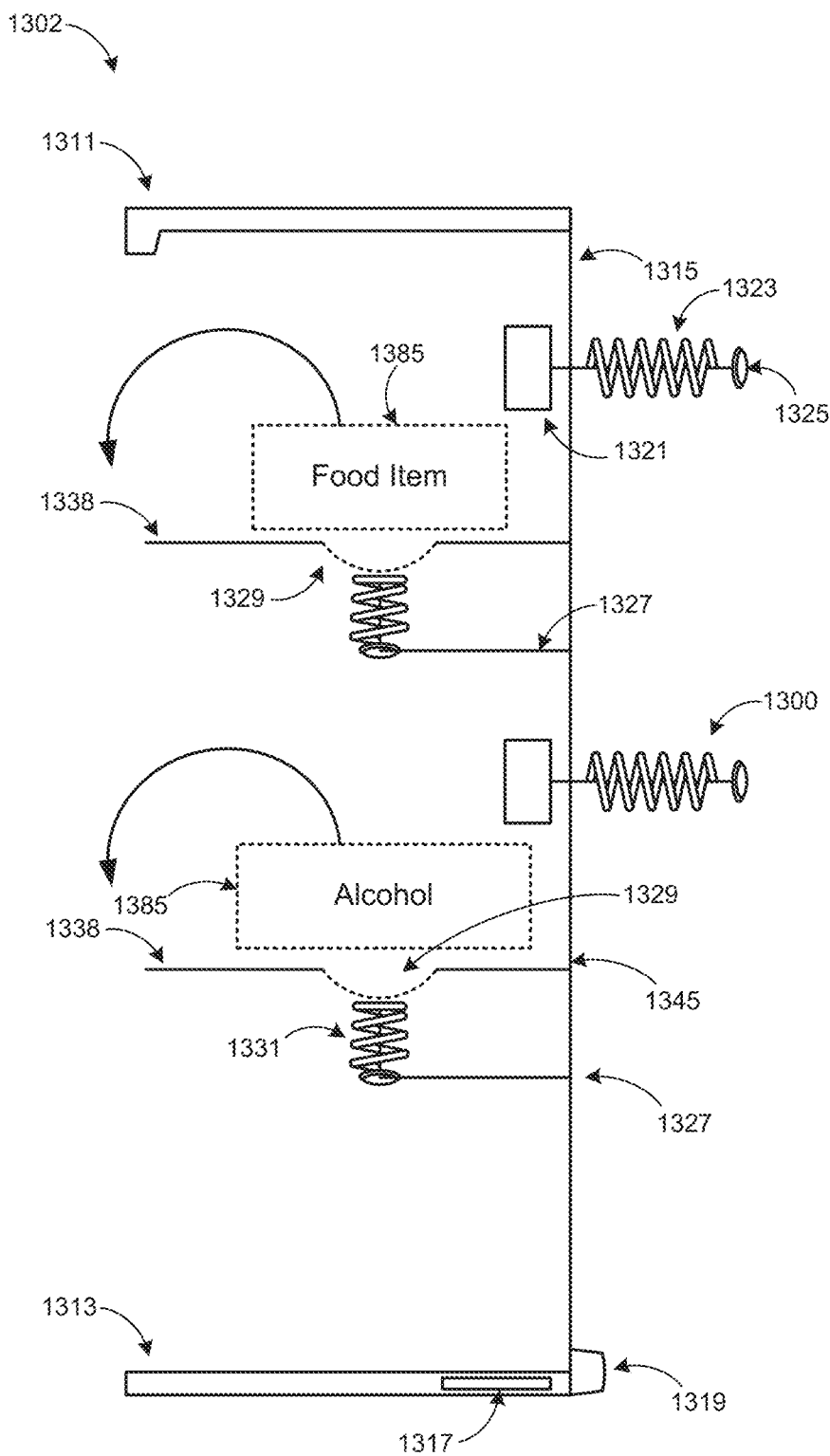

Referring to FIG. 13C, in the present embodiment, a smart shelves unit 1302 may include a top 1311, a bottom 1313, a back 1315, and shelves 1338. In the present embodiment, unit 1302 may be a part of an assembly of a plurality of smart shelve units and positioned facing a conveyor belt or aisle. In the present embodiment, shelves 1338 may be adjustable in height for supporting various size items 1385. In the present embodiment, a computing unit 1317 and an on/off switch 1319 may be located in bottom 1313. In other embodiments, computing unit 1317 may be located in top 1311 or back 1315. In some alternate embodiments, shelves 1338 may each contain a computing unit 1317 and an on/off switch 1319. In some alternate embodiments, switch 1319 may include an indicator light for indicating a status of computing unit 1317. In the present embodiment computing unit 1317 may communicate bi-directionally with computing unit 1105 for distribution and inventory of items 1385. In a non-limiting example, some grocery items may need to be moved in a manner that protects the product from breakage, for example, but not limited to, a bottle of wine or beer bottle. In these cases, it is important that the shelf only move the appropriate amount of items onto a cushioned area on the conveyor belt and/or aisle. In the present embodiment, shelves 1338 may include an opening 1329. In the present embodiment, computing unit 1317 may activate shelves 1338 to move one or more items 1385 from shelve 1338 to the conveyor belt or aisle. In the present embodiment, computing unit 1317 may activate item mover 1321 through mechanism 1323 to move item 1385 to cover opening 1329. Computing unit 1317 may then activate lever 1327 to compress spring 1331 against item 1385 to spring item 1385 into the air and onto a onto a cushioned area on the conveyor belt and/or aisle. In other embodiments, items 1385 may be moved from shelves 1338 by a manual control 1325.

Figure 13D:
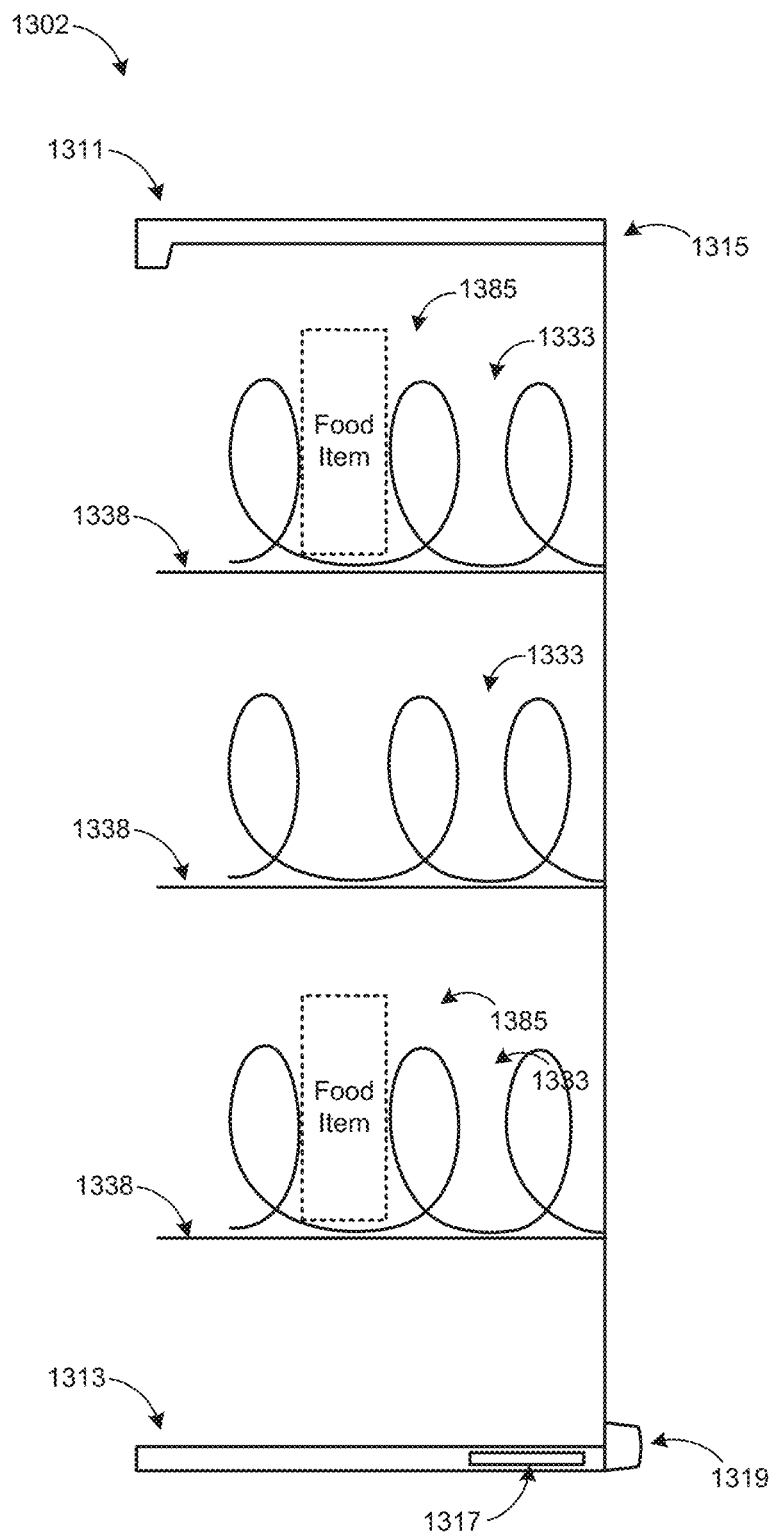

Referring to FIG. 13D, in the present embodiment, a smart shelves unit 1303 may include a top 1311, a bottom 1313, aback 1315, and shelves 1338. In the present embodiment, unit 1303 may be a part of an assembly of a plurality of smart shelve units and positioned facing a conveyor belt or aisle. In the present embodiment, shelves 1338 may be adjustable in height for supporting various size items 1385. In the present embodiment, a computing unit 1317 and an on/off switch 1319 may be located in bottom 1313. In other embodiments, computing unit 1317 may be located in top 1311 or back 1315. In some alternate embodiments, shelves 1338 may each contain a computing unit 1317 and an on/off switch 1319. In some alternate embodiments, switch 1319 may include an indicator light for indicating a status of computing unit 1317. In the present embodiment computing unit 1317 may communicate bi-directionally with computing unit 1105 for distribution and inventory of items 1385. In the present embodiment, shelves 1338 may include rotatable coils 1333. These shelves may operate similar to the way a vending machine distributes products from a top to a bottom. Items such as, but not limited to, as lipsticks, books or other items may be stored in this space. In the present embodiment, computing unit 1317 may activate a row of coils 1333, dropping one item 1385 from one of the coils in the row and send the item to the conveyor belt and/or aisle. Each coil may move the item directly behind it to the front position. This shelf may be operated manually if necessary.

Figure 13E:
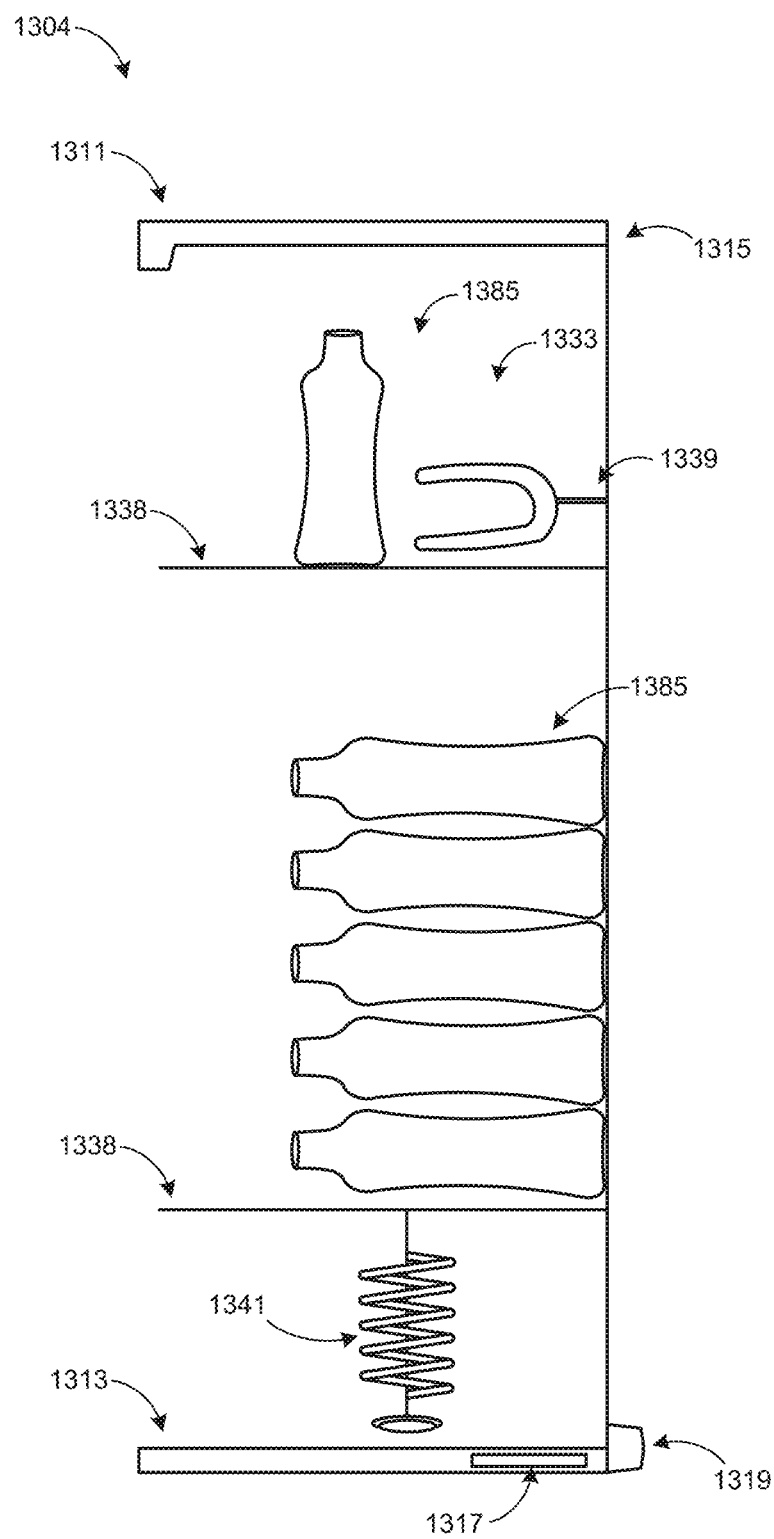

Referring to FIG. 13E, in the present embodiment, a smart shelves unit 1304 may include a top 1311, a bottom 1313, a back 1315, and shelves 1338. In the present embodiment, unit 1304 may be a part of an assembly of a plurality of smart shelve units and positioned facing a conveyor belt or aisle. In the present embodiment, shelves 1338 may be adjustable in height for supporting various size items 1385. In the present embodiment, a computing unit 1317 and an on/off switch 1319 may be located in bottom 1313. In other embodiments, computing unit 1317 may be located in top 1311 or back 1315. In some alternate embodiments, shelves 1338 may each contain a computing unit 1317 and an on/off switch 1319. In some alternate embodiments, switch 1319 may include an indicator light for indicating a status of computing unit 1317. In the present embodiment computing unit 1317 may communicate bi-directionally with computing unit 1105 for distribution and inventory of items 1385. In the present embodiment, shelves 1338 may include a robotic arm 1339. In the present embodiment, this shelf may operate in a manner that allows items 1385 to be store individually, not in a package or box. In some embodiments, items 1385 may be refrigerated with a protective glass door (not shown). In the present embodiment, computing unit 1317 may activate a mechanism 1341 to raise a shelf 1338. In the present embodiment, computing unit 1317 may activate robotic arm 1339 to grab the item and turn it upwards to be grabbed by an employee and or dropped onto the conveyor belt and/or aisle. In some embodiments, robotic arm 1339 may include a mechanical claw with a strong bendable coil. In some embodiments, the long bendable coil may extend a certain distance to drop the item away from the shelf. In some alternate embodiments, if unit 1304 is refrigerated, computing unit 1317 may be utilized to control a temperature.

Figure 13F:
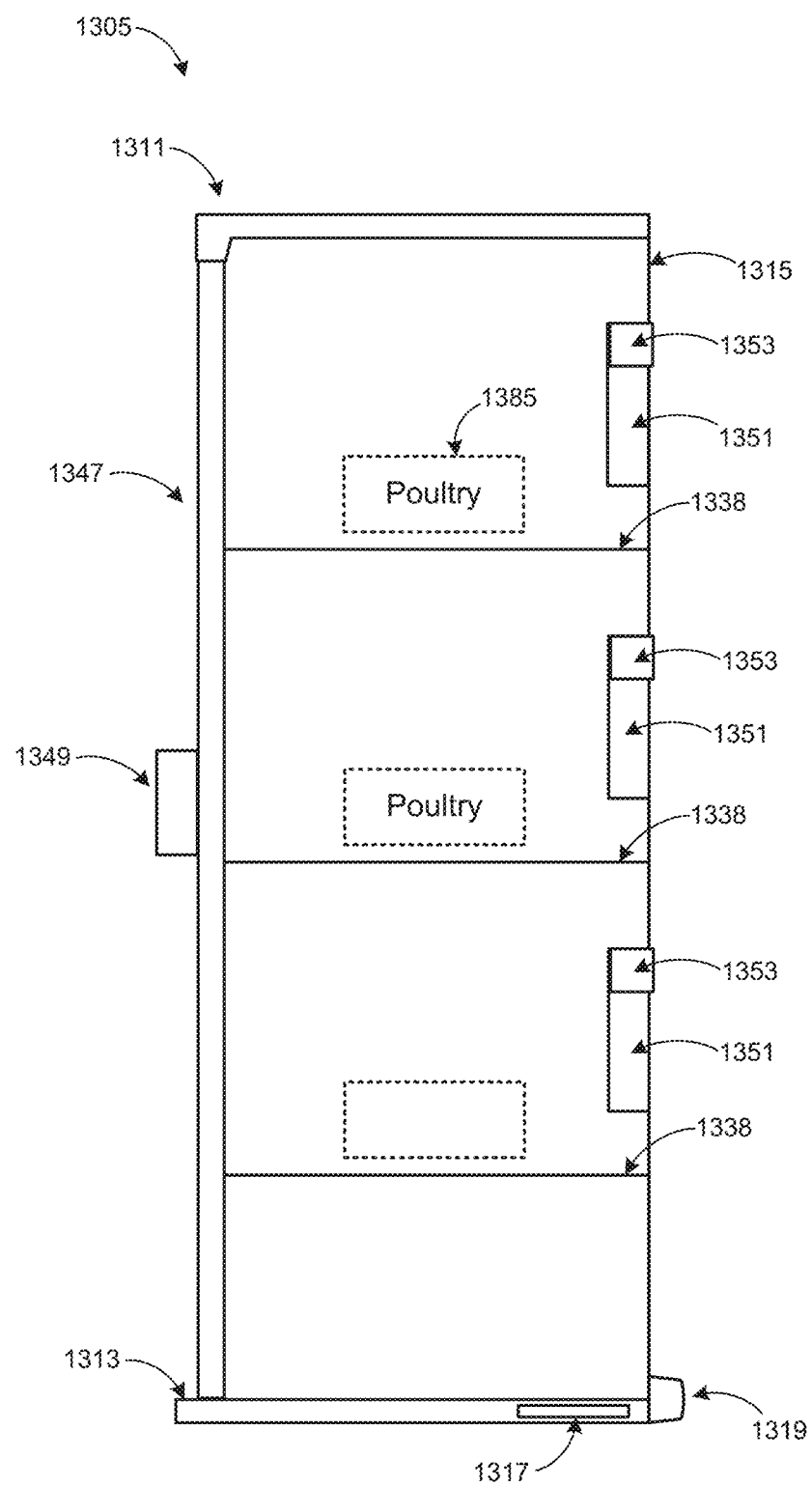

Referring to FIG. 13F, in the present embodiment, a smart shelves unit 1305 may include a top 1311, a bottom 1313, aback 1315, and shelves 1338. In the present embodiment, unit 1305 may be a part of an assembly of a plurality of smart shelve units and positioned facing a conveyor belt or aisle. In the present embodiment, shelves 1338 may be adjustable in height for supporting various size items 1385. In the present embodiment, a computing unit 1317 and an on/off switch 1319 may be located in bottom 1313. In other embodiments, computing unit 1317 may be located in top 1311 or back 1315. In some alternate embodiments, shelves 1338 may each contain a computing unit 1317 and an on/off switch 1319. In some alternate embodiments, switch 1319 may include an indicator light for indicating a status of computing unit 1317. In the present embodiment computing unit 1317 may communicate bi-directionally with computing unit 1105 for distribution and inventory of items 1385. In the present embodiment, shelves 1338 area may include a light unit 1351. In some embodiments, if unit 1305 is refrigerated, unit 1305 may include an essentially transparent door 1347 with a handle 1349. In the present embodiment, computing unit 1317 may signal each shelf to highlight, using light unit 1351, a particular row of grocery items that are needed for check out. In a non-limiting example, if a station or lane purple needs a poultry item, the software may signal the specific shelf of the poultry item that holds the item and signal a purple flashing light. Whether the shelf is refrigerated or unrefrigerated, it may glare the light to make it quickly recognizable to personnel. In some embodiments, light unit 1351 may include a scanning unit 1353. Scanning unit 1353 may send a signal to the checkout station or overflow station that there are no items available or signal the exact aisle and shelf the item is located in. In a non-limiting example, if personnel decided to switch some poultry items because many were sold the day before, it may alert the early-morning employee to the precise location of the item. In a non-limiting example, if item 1385 contains a sticker or SKU that indicates various differences in pricing such as, but not limited to, $5.56 for 1.2 lbs. or $6.47 for 1.8 lbs., scanning unit 1353 may scan the items and provide specifics pricing details to the consumer using the app or web site. In some alternate embodiments, if unit 1305 is refrigerated, computing unit 1317 may be utilized to control a temperature.

Figure 13G:
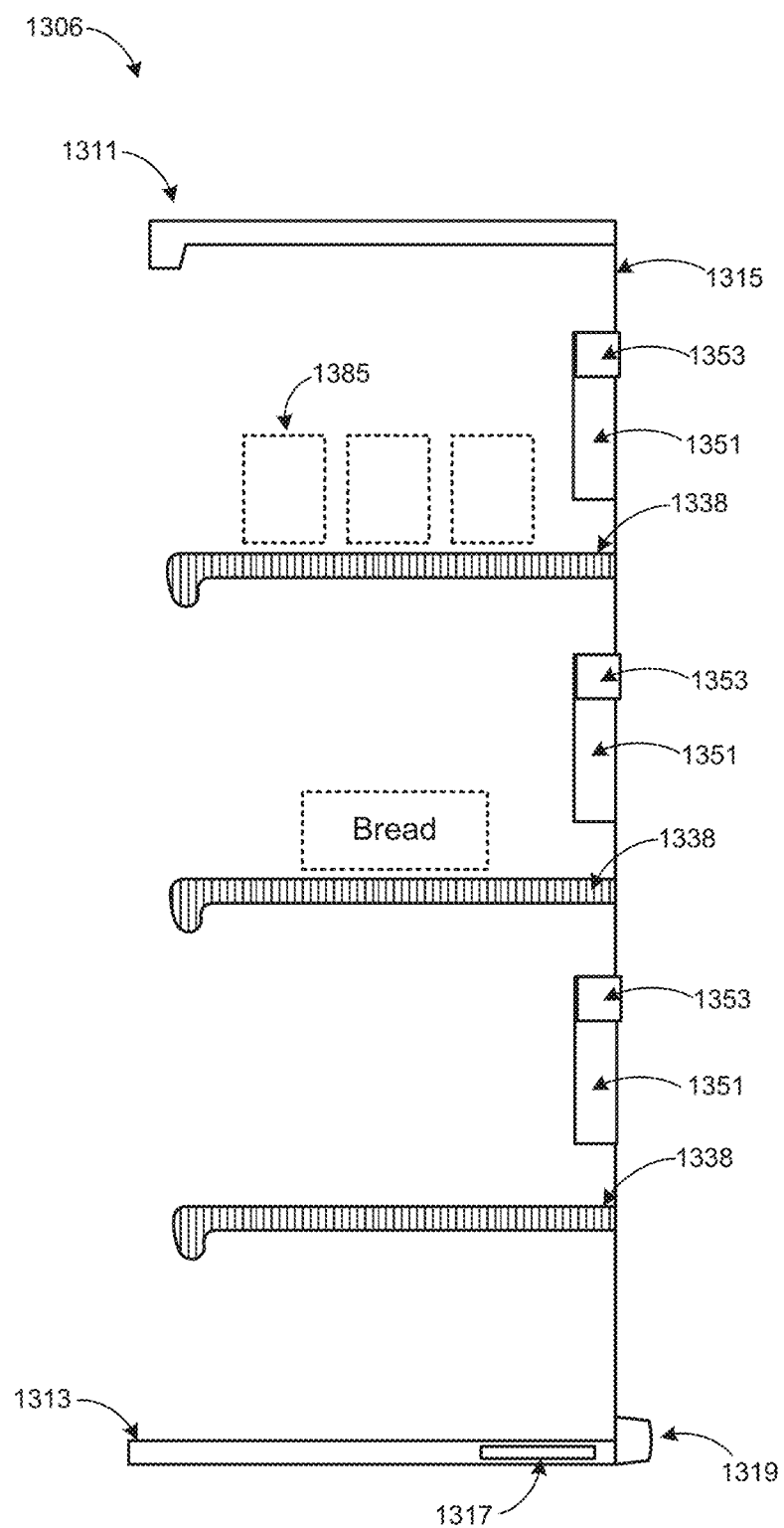

Referring to FIG. 13G, in the present embodiment, a smart shelves unit 1306 may include a top 1311, a bottom 1313, a back 1315, and shelves 1338. In the present embodiment, unit 1306 may be a part of an assembly of a plurality of smart shelve units and positioned facing a conveyor belt or aisle. In the present embodiment, shelves 1338 may be adjustable in height for supporting various size items 1385. In the present embodiment, a computing unit 1317 and an on/off switch 1319 may be located in bottom 1313. In other embodiments, computing unit 1317 may be located in top 1311 or back 1315. In some alternate embodiments, shelves 1338 may each contain a computing unit 1317 and an on/off switch 1319. In some alternate embodiments, switch 1319 may include an indicator light for indicating a status of computing unit 1317. In the present embodiment computing unit 1317 may communicate bi-directionally with computing unit 1105 for distribution and inventory of items 1385. In the present embodiment, shelves 1338 may each include a conveyer belt. In the present embodiment, shelves 1338 area may include a light unit 1351. In the present embodiment, computing unit 1317 may signal each shelf to highlight, using light unit 1351, a particular row of grocery items that are needed for check out. In a non-limiting example, if a station or lane purple needs a bread item, the software may signal the specific shelf of the bread item that holds the item and signal a purple flashing light. In some embodiments, light unit 1351 may include a scanning unit 1353. Scanning unit 1353 may send a signal to the checkout station or overflow station that there are no items available or signal the exact aisle and shelf the item is located in. In a non-limiting example, if personnel decided to switch some bread items because many were sold the day before, it may alert the early-morning employee to the precise location of the item. In a non-limiting example, if item 1385 contains a sticker or SKU that indicates various differences in pricing, scanning unit 1353 may scan the items and provide specifics pricing details to the consumer using the app or web site.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112(6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112(6). In some embodiments, the methods and/or system components which may be located and/or performed remotely include, without limitation: manufacturing of system components.

It is noted that according to USA law, all claims must be set forth as a coherent, cooperating set of limitations that work in functional combination to achieve a useful result as a whole. Accordingly, for any claim having functional limitations interpreted under 35 USC § 112(6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112(6) is/(are) dependent on one or more remote servers located outside the USA, it is intended that each such recited function under 35 USC § 112(6) is to be interpreted as the function of the local system receiving the remotely generated information required by a locally implemented claim limitation, wherein the structures and or steps which enable, and breathe life into the expression of such functions claimed under 35 USC § 112(6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112(6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112(1), all claims must be supported by sufficient disclosure in the present patent specification, and any material known to those skilled in the art need not be explicitly disclosed. However, 35 USC § 112(6) requires that structures corresponding to functional limitations interpreted under 35 USC § 112(6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) when such corresponding structures are not explicitly disclosed in the foregoing patent specification. Therefore, for any invention element(s)/structure(s) corresponding to functional claim limitation(s), in the below claims interpreted under 35 USC § 112(6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3rd parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112(6). Applicant(s) note that all the identified documents above which are incorporated by reference to satisfy 35 USC § 112(6) necessarily have a filing and/or publication date prior to that of the instant application, and thus are valid prior documents to incorporated by reference in the instant application.

Having fully described at least one embodiment of the present invention, other equivalent or alternative methods of implementing a drive-through service according to the present invention will be apparent to those skilled in the art. Various aspects of the invention have been described above by way of illustration, and the specific embodiments disclosed are not intended to limit the invention to the particular forms disclosed. The particular implementation of a drive-through service may vary depending upon the particular context or application. By way of example, and not limitation, a drive-through service described in the foregoing were principally directed to a drive-through service for grocery shopping implementations; however, similar techniques may instead be applied to a drive-through service for any store with a high volume of products, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system for use in consolidating items into orders and delivering items to a workstation, comprising:
a plurality of workstations, each workstation including:
a workstation scanning device;
an assembling area for assembling orders; and
a display monitor positioned near the assembling area;
an assembly line system configured to deliver items to the plurality of workstations;
an assembly line device, automated machine, humanoid or robot configured to identify items being transported by the assembly line system; and
a computing system to execute the steps of:
receiving an order notification indicating an order;
identifying items included in the order;
assigning a corresponding workstation to the order; and
operating the assembly line system to deliver the identified items included in the order to the corresponding workstation including:

receiving information indicating a plurality of items being transported by the assembly line system from assembly line devices, conveyors, automated machines, humanoids or robots;

receiving information from a corresponding workstation scanning device, automated machine, humanoid or robot associated with the corresponding workstation indicating a corresponding item included in the order is adjacent to the corresponding workstation; and displaying a notification message on a corresponding display monitor associated with the corresponding workstation indicating the corresponding item is adjacent to the corresponding workstation.

2. The system of claim 1, wherein the computing system is further programmed to display an image of the corresponding item on the corresponding display monitor.

3. The system of claim 1, wherein the computing system is further programmed to display the order on the corresponding display monitor including a list of the identified items.

4. The system of claim 3, wherein the computing system is further programmed to display a plurality of orders on the corresponding display monitor in ascending order via a time stamp, an adjusted order delivery time, or priority.

5. The system of claim 1, further comprising a plurality of storage units for storing items and delivering items to the assembly line system.

6. The system of claim 5, wherein at least one storage unit includes a light unit, the computer system is programmed to operate the light unit to identify items according to a programmed sorting method.

7. The system of claim 1, wherein at least one workstation includes a computerized sacker.

8. The system of claim 7, wherein the computerized sacker is programed to:
  determine a product characteristic associated with the corresponding item;
  calculate a sacking plan based on the determined product characteristic; and
  assemble the order based on the calculated sacking plan.

9. The system of claim 1, further comprising an area for storing an assembled order.

10. The system of claim 1, further comprising artificial intelligence for identifying items.

11. A method of operating a system for use in consolidating items into orders and delivering items to a workstation in a warehouse, the system including a plurality of workstations, an assembly line system configured to deliver items to the plurality of workstations, an assembly line device configured to identify items being transported by the assembly line system, and a computing system including a processor, each workstation includes a workstation scanning device, an assembling area for assembling orders, and a display monitor positioned near the assembling area, the method including the processor of the computing system executing the steps of:
  receiving an order notification indicating an order;
  identifying items included in the order;
  assigning a corresponding workstation to the order; and
  operating the assembly line system to deliver the identified items included in the order to the corresponding workstation including:
  receiving first information from the assembly line device indicating a plurality of items being transported by the assembly line system;
  receiving second information from a corresponding workstation scanning device associated with the corresponding workstation indicating a corresponding item included in the order is adjacent to the corresponding workstation; and
  displaying a notification message on a corresponding display monitor associated with the corresponding workstation indicating the corresponding item is adjacent to the corresponding workstation.

12. The method of claim 11, including the processor executing the steps of:
  displaying an image of the corresponding item on the corresponding display monitor.

13. The method of claim 11, including the processor executing the steps of:
  displaying the order on the corresponding display monitor including a list of the identified items.

14. The method of claim 13, including the processor executing the steps of:
  displaying a plurality of orders on the corresponding display monitor in ascending order via a time stamp, an adjusted order delivery time, or priority.

15. The method of claim 11, wherein the system includes a plurality of storage units for storing items and delivering items to the assembly line system.

16. The method of claim 11, including the processor executing the steps of:
  operating a computerized sacker to assemble the order.

17. The method of claim 11, wherein the corresponding workstation includes a computerized sacker, the method including the processor executing the steps of:
  determining a product characteristic associated with the corresponding item;
  calculating a sacking plan based on the determined product characteristic; and
  operating the computer sacker to assemble the order based on the calculated sacking plan.

18. The method of claim 11, further comprising using artificial intelligence for identifying items.

* * * * *